US 8,373,867 B2

United States Patent
Nakai et al.

(12) United States Patent
(10) Patent No.: US 8,373,867 B2
(45) Date of Patent: Feb. 12, 2013

(54) DISPLAY-INTEGRATED IMAGE FORMING APPARATUS, IMAGE DISPLAY SYSTEM, AND IMAGE DISPLAY METHOD

(75) Inventors: Yasuhiro Nakai, Osaka (JP); Satoshi Machino, Osaka (JP); Masanori Matsumoto, Osaka (JP); Tsutomu Yoshimoto, Osaka (JP); Hiroyuki Sawai, Osaka (JP); Osamu Ueda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 723 days.

(21) Appl. No.: 12/471,088

(22) Filed: May 22, 2009

(65) Prior Publication Data
US 2009/0293020 A1  Nov. 26, 2009

(30) Foreign Application Priority Data

May 26, 2008 (JP) ................................. 2008-137118

(51) Int. Cl.
*G06F 3/12* (2006.01)
(52) U.S. Cl. ............... 358/1.1; 725/32; 725/34; 725/35; 725/36; 725/37; 725/43; 725/61; 358/1.15; 709/200
(58) Field of Classification Search .............. 358/1.13, 358/1.15, 1.16; 725/32, 34, 35, 36, 61, 87; 705/14.4, 14.59; 709/200–250
See application file for complete search history.

(56) References Cited

U.S. PATENT DOCUMENTS

| 7,492,472 B2 | 2/2009 | Penke et al. | |
| 8,151,304 B2* | 4/2012 | Nathan et al. | 725/61 |
| 2002/0165768 A1 | 11/2002 | Haraguchi et al. | |
| 2004/0156065 A1* | 8/2004 | Suzuki | 358/1.15 |
| 2005/0096849 A1* | 5/2005 | Sorrells | 705/1 |
| 2008/0158602 A1* | 7/2008 | Nakai | 358/1.16 |
| 2008/0247543 A1* | 10/2008 | Mick et al. | 725/87 |
| 2008/0288975 A1* | 11/2008 | Chen et al. | 725/32 |

FOREIGN PATENT DOCUMENTS

| JP | 2001-306928 A | 2/2001 |
| JP | 2001-350433 A | 12/2001 |
| JP | 2002-55501 A | 2/2002 |
| JP | 2002-156873 A | 5/2002 |
| JP | 2003-323083 A | 11/2003 |

(Continued)

OTHER PUBLICATIONS

English Machine Translation of JP 2001-306928-A (Fujiwara, published Nov. 11, 2002).*

(Continued)

*Primary Examiner* — Benny Tieu
*Assistant Examiner* — Juan M Guillermety
(74) *Attorney, Agent, or Firm* — Birch, Stewart, Kolasch & Birch, LLP

(57) ABSTRACT

A digital multifunction peripheral provided with a scanner portion, an operation portion, an image forming portion, a device control portion, a fax modem, a communications portion, a management portion, and a hard disk (HD) is connected to a server apparatus via an external network. A large-format display is attached integrally to a rear face of a case of the digital multifunction peripheral, with a first display screen facing toward the outside. The device control portion is connected to the server apparatus via the external network, and displays various pieces of provided information managed by the server apparatus on the first display screen.

36 Claims, 28 Drawing Sheets

FOREIGN PATENT DOCUMENTS

| | | |
|---|---|---|
| JP | 2005-137012 A | 5/2005 |
| JP | 2005-274811 A | 10/2005 |

OTHER PUBLICATIONS

English Machine Translation of JP 2001-350433-A (Kurihara, published Dec. 21, 2001).*

English Machine Translation of JP 2002-156873-A (Takeda, published May 31, 2002).*

English Machine Translation of JP 2008-227813-A (Sako, Published Sep. 25, 2008).*

* cited by examiner

FIG.2
(a)
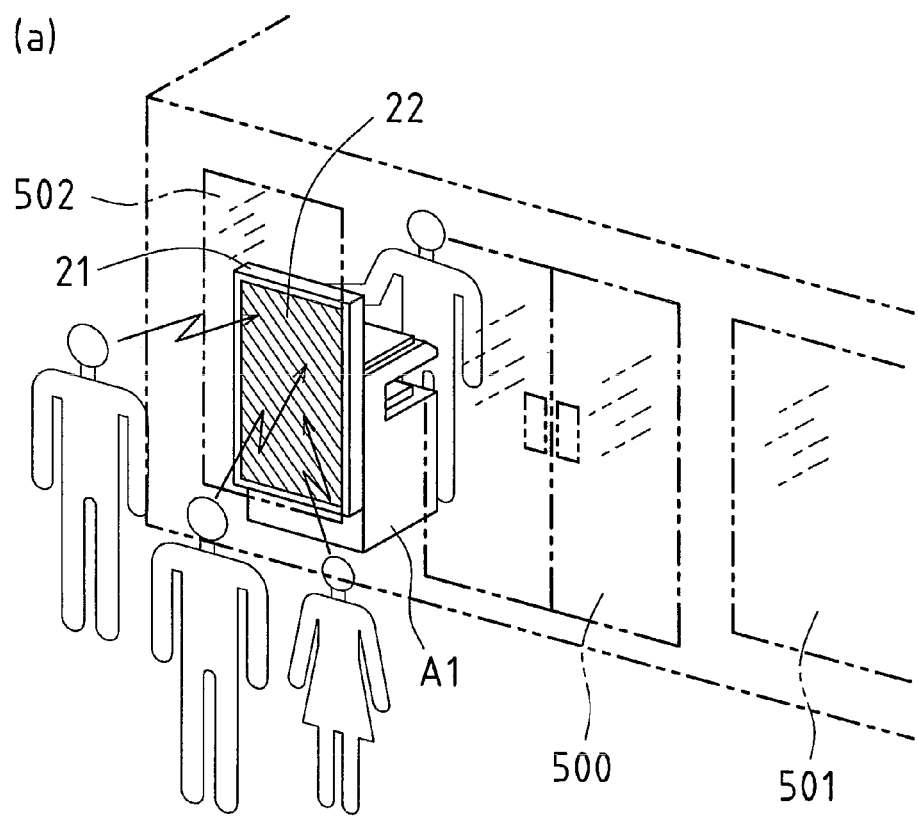
(b)
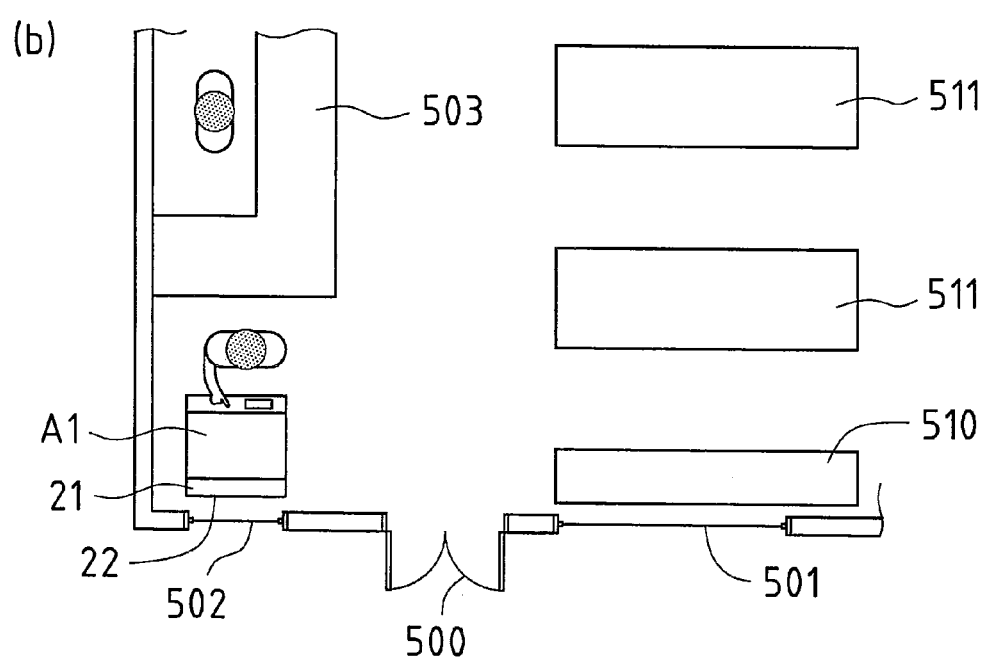

FIG.13
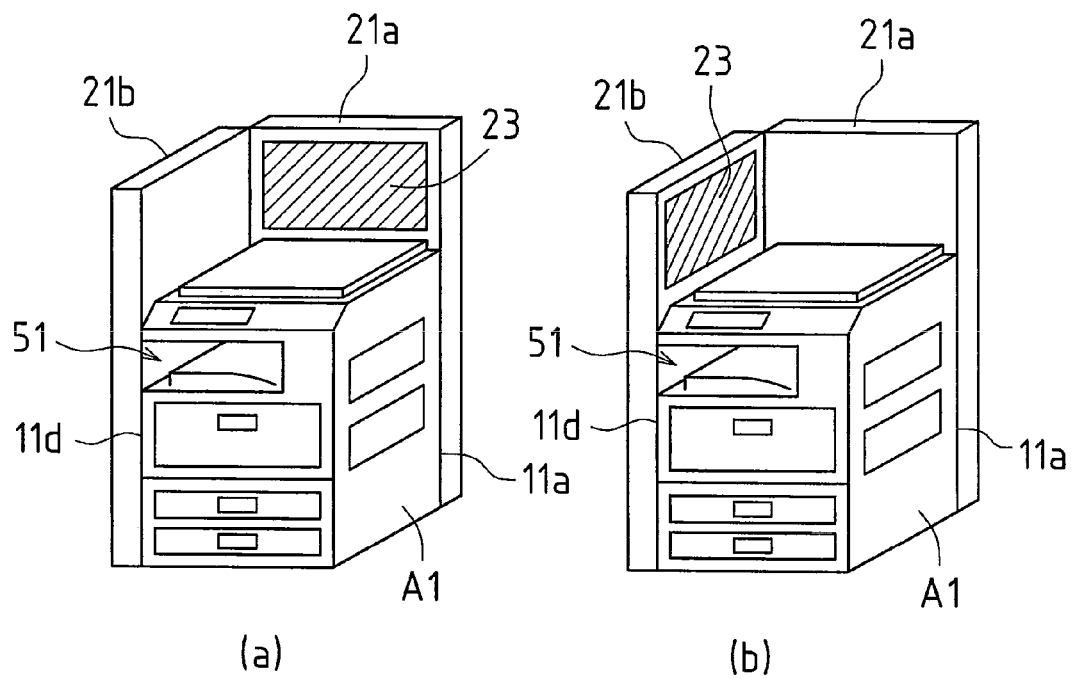
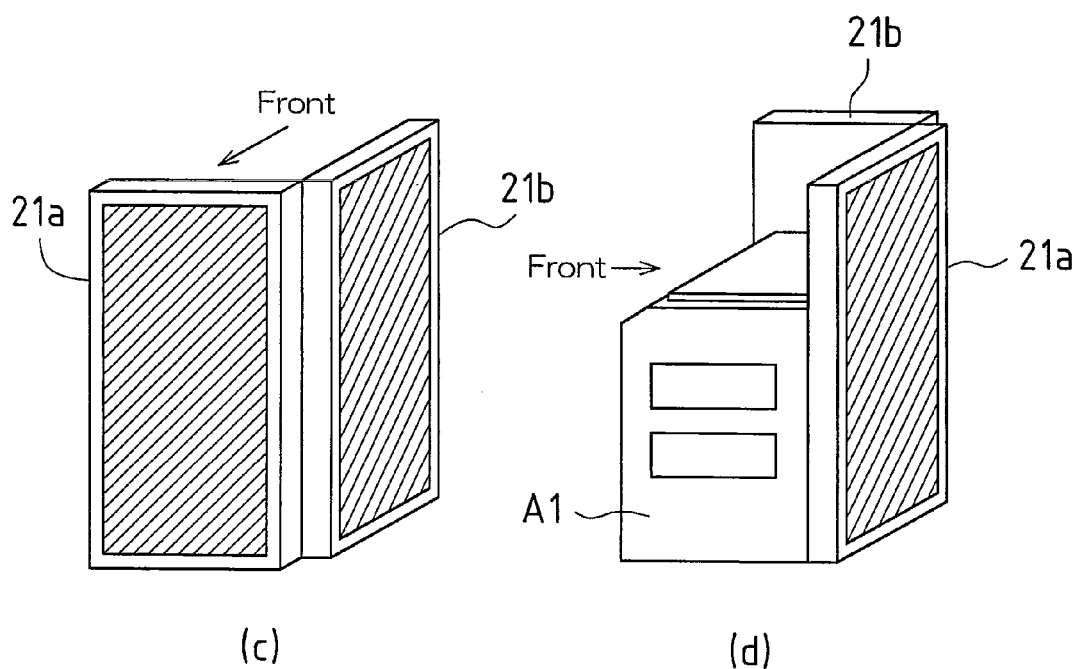

FIG. 18A
(a) 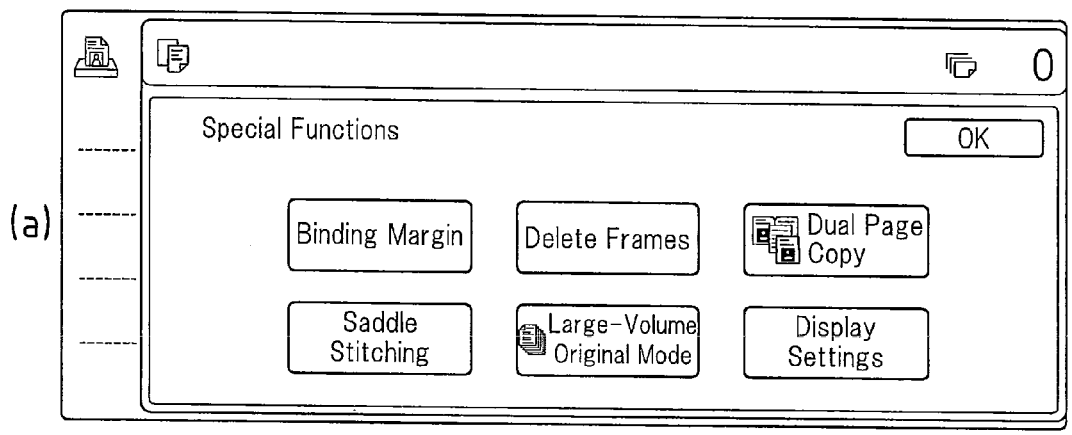
(b) 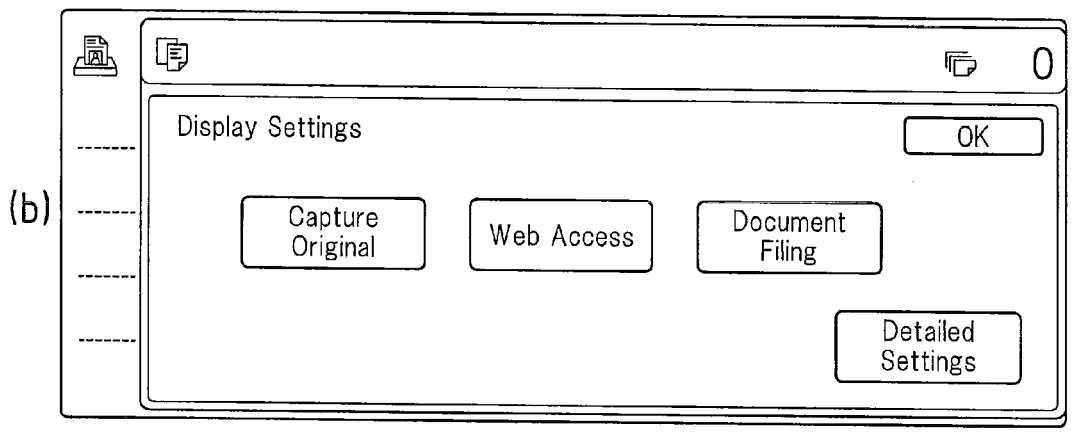
(c) 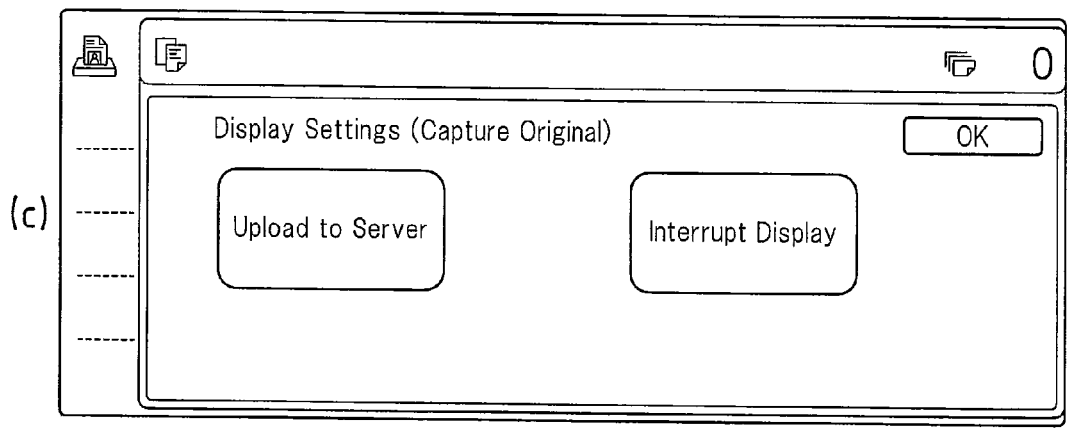

FIG.18B
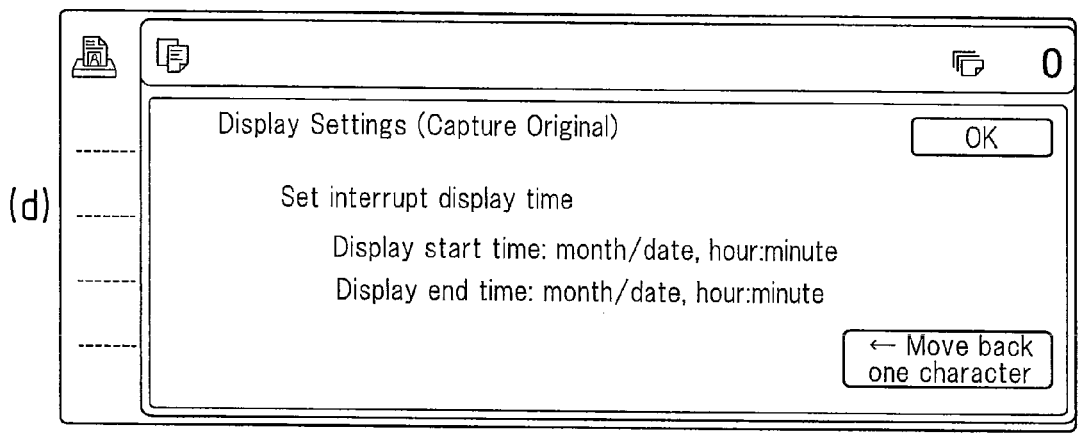
(d)
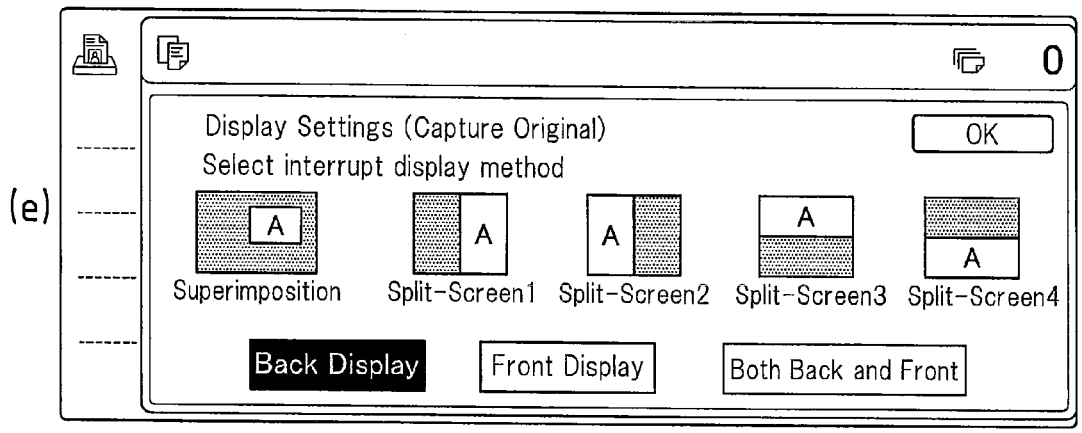
(e)
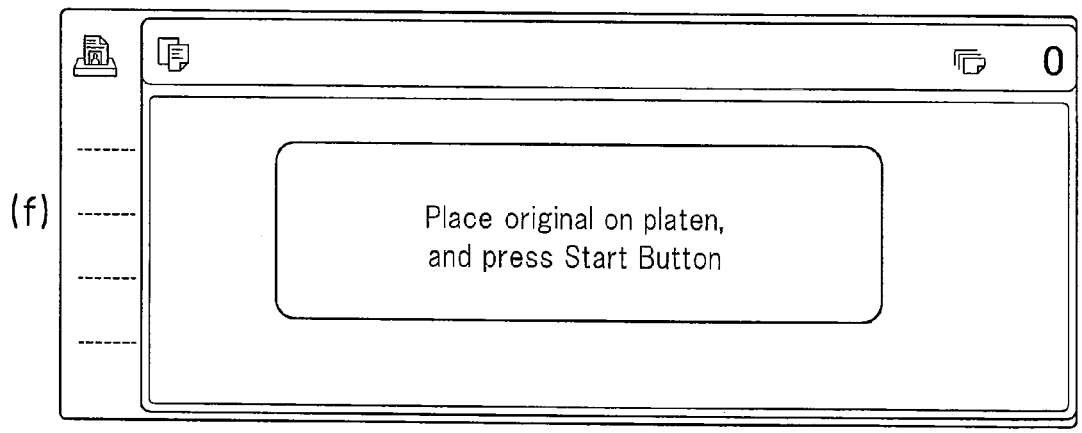
(f)

(a) (b)

DISPLAY-INTEGRATED IMAGE FORMING APPARATUS, IMAGE DISPLAY SYSTEM, AND IMAGE DISPLAY METHOD

BACKGROUND OF THE INVENTION

This application claims priority under 35 U.S.C. §119(a) on Patent Application No. 2008-137118 filed in Japan on May 26, 2008, the entire contents of which are herein incorporated by reference.

The present invention relates to an image forming apparatus such as a multifunction peripheral or digital copier, and more specifically relates to a display-integrated image forming apparatus in which a large-format display apparatus is integrated with an image forming apparatus, and to an image display system and an image display method.

Recently, many image forming apparatuses such as multifunction peripherals and digital copiers are being installed in mass retail stores or the like such as convenience stores and supermarkets, and such image forming apparatuses are used mainly, for example, when a user that uses the store takes a copy of an original.

Incidentally, in recent convenience stores, the section of the store that faces the street (walkway) is entirely encased in glass, and products are displayed such that people walking along the walkway can view and see the state of the inside of the store at a glance. For example, in an ordinary arrangement pattern as shown in FIG. 30, a wide space-side glass window 501 and a narrow space-side glass window 502 are provided with an entrance 500 between them, a bookshelf 510 is placed along the wide space-side glass window 501, an image forming apparatus A is placed along the narrow space-side glass window 502, and a register counter (not shown) is disposed behind the image forming apparatus A within the store. In such an arranged configuration, conventionally, paper advertisements 505 such as posters are directly applied, facing out of the store, to the walkway-side glass windows 501 and 502, so as to publicise various publicity activities to pedestrians. Publicity activities to customers inside the store are publicised by posting paper advertisements in the small amounts of open space on display shelves within the store.

During such publicity activities, it is difficult to frequently change advertisements, so there is a problem in that flexible publicity activities according to the time of day are not possible, such as, for example, advertising that targets businessmen during a time period of the day in which many businessmen pass by, and advertising that targets housewives and students during the daytime, in which many housewives and students pass by.

Also, the technique in which the walkway-side of the store is entirely encased in glass and advertisements are posted on that glass face is also adopted by real estate companies and the like, so that various real estate advertisements posted all over the glass face wall are provided to passers-by. However, in this case as well, it is necessary for employees to manually remove information on real estate that is under a rental contract or purchase contract, and post new real estate information or the like, and this is problematic in that removal, posting, or the like is frequently forgotten and, therefore, the provided information may not be the newest information.

In addition, as already described above, currently, the image forming apparatus placed in each store is mainly used only when a user of the store takes a copy of an original and is rarely used for other purposes. Accordingly, attempts have been made to improve the usage efficiency of such an image forming apparatus (see, for example, JP 2002-329139A, JP 2002-156873A and JP 2002-55501A).

JP 2002-329139A (hereinafter referred to as Patent Document 1) describes an advertisement information processing system in which a wall display and a printer connected to each other are placed in a store, and when a print button that corresponds to advertisement information displayed on the wall display is pressed, the advertisement information for which that print button was pressed can be printed by the printer.

JP 2002-156873A (hereinafter referred to as Patent Document 2) describes an image processing apparatus that serves as a copier and is connected to a cash register with a LAN, and when a poster image original that has been placed on a platen of the copier is captured, the poster image is displayed on an operation screen of the copier and also on a display apparatus of the cash register via the LAN.

JP 2002-55501A (hereinafter referred to as Patent Document 3) describes an image forming apparatus that has a liquid crystal monitor attached to a front cover or side face cover of the main body of the image forming apparatus, and that is configured to display the output signal from a personal computer on the display portion of the liquid crystal monitor.

As described above, there have been attempts to increase advertising publicity functionality using an image forming apparatus, by connecting the image forming apparatus to a display apparatus, and printing advertising information displayed on the display apparatus with the image forming apparatus, or displaying a poster image that has been captured with the image forming apparatus on an operation screen of the image forming apparatus or on a display apparatus of a cash register.

However, in the technique described in Patent Document 1, it is necessary to install a display along the entire walkway-side wall face, and connect the display to a printer installed within the store with a communications cable, so a lot of installation work is needed, and installation in each store is necessary, so there is a problem in that such installation work is very complicated. There is also another problem in that the layout cannot be changed easily after it is installed once, even when it is necessary to change the layout according to circumstances.

Furthermore, in the technique described in Patent Document 2, although advertising information can be displayed on an operation screen of an image forming apparatus or a display screen of a cash register, this is a publicity advertisement to customers inside the store, and not a publicity advertisement to people walking along the walkway in front of the store. There is also a problem in that by only displaying advertising information on an operation screen of an image forming apparatus or a display screen of a cash register, even most customers inside the store do not notice the advertising information; thus, an adequate publicity effect is not obtained.

Likewise, in the technique described in Patent Document 3, although advertising information can be displayed on the display screen of the liquid crystal monitor, this is a display to the operators of the image forming apparatus, and not a publicity advertisement to people walking along the walkway in front of the store. It is also conceivable to publicise an advertisement to customers inside the store by displaying advertisement information on a liquid crystal monitor, but there is a problem in that by only displaying advertising information on the display screen of such a small liquid crystal monitor, even most customers inside the store do not notice the advertising information; thus, an adequate publicity effect is not obtained.

Furthermore, according to Patent Documents 1 and 2, data such as advertisement information is stored in each of the apparatuses installed in stores and the like, so more storage capacity will be needed as the data increases.

A technique is also adopted in which an image forming apparatus and a large screen (for example, a 50-inch screen, etc.) display apparatus connected by a cable are installed in stores, but in a store such as a convenience store or a supermarket, the issue is to secure as large a selling area as possible, and because placement of two large devices in this manner results in a reduction in selling area, this technique has not been widely adopted. In addition, in a small store, it may not be possible to secure an installation location for such large devices, and so the system is not necessarily advantageous to the store. For example, the outer dimensions of a 52-inch liquid crystal display (Sharp PN-525) are a height of 1254 mm×a width of 742 mm×a depth of 92 mm, and a weight of 44 Kg. The outer dimensions of a liquid crystal display stand (Sharp ID-DS03W) are a width of 917 mm×a depth of 870 mm. The outer dimensions of a digital multifunction peripheral (Sharp MX-3500FN) are a height of 950 mm×a width of 645 mm×a depth of 670 mm, and a weight of 120 Kg. Here, if the liquid crystal display and the digital copier are placed in series, the necessary occupied floor area will be the width: liquid crystal display stand width of 917 mm×the depth: 1540 mm (digital copier depth of 670 mm+liquid crystal display stand depth of 870 mm).

The present invention has been conceived to address the problems described above, and it is an object of the present invention to provide a display-integrated image forming apparatus with which it is possible to provide an adequate publicity effect to walkway pedestrians without requiring a large installation location and with very simple installation work.

SUMMARY OF THE INVENTION

In order to address the above problems, a display-integrated image forming apparatus of the present invention includes an original capturing portion, an operation portion, a print portion which performs print operation in response to an operation of the operation portion, and a control portion which controls these portions, wherein a display apparatus that has a display screen visible from a back face or a side face of the image forming apparatus is disposed on at least the back face or one side face of a case of the image forming apparatus, and the control portion is connected to a server apparatus via a network, and displays various pieces of provided information managed by the server apparatus on the display screen.

According to such a configuration, the image forming apparatus is used also as a leg portion of the display apparatus, and it is thus possible to fit two large devices, namely the image forming apparatus and the display apparatus, substantially within the installation space of an image forming apparatus. As already mentioned above, if the liquid crystal display, which is a display apparatus, and the digital copier, which is an image forming apparatus, are placed in series, the necessary occupied floor area will be the width: liquid crystal display stand width of 917 mm×the depth: 1540 mm (digital copier depth 670 mm+liquid crystal display stand depth 870 mm), but if the liquid crystal display is attached to the back face of the digital multifunction peripheral, the necessary occupied floor area will be only the width: liquid crystal display width of 742 mm×the depth: 762 mm (liquid crystal display depth of 92 mm+digital multifunction peripheral depth of 670 mm). Also, balance is poor when the liquid crystal display is placed vertically, but by being integrated with the digital multifunction peripheral, the weight balance of the digital multifunction peripheral and the liquid crystal display will be balanced, so stable installation is possible. Thus, even in a small store such as a convenience store or a supermarket, the display-integrated image forming apparatus of the present invention can be installed in about the same location as a conventional image forming apparatus. In this case, when the display apparatus is attached to, for example, the rear face of the image forming apparatus such that the display screen faces outside, by only installing the image forming apparatus inside the store in a conventional manner, the display screen of the display apparatus faces pedestrians outside the store through the street-side (i.e., the walkway-side) wall face glass. Accordingly, by displaying advertising information on the display screen of this display apparatus, it is possible to provide publicity advertisements with impact to pedestrians outside the store.

Also, a configuration is adopted in which various pieces of provided information managed by the server apparatus are obtained via the network as advertisement information displayed on the display screen. That is, because data such as advertisements can be stored and managed collectively by the external server apparatus, the storage capacity of the display-integrated image forming apparatus installed in a store or the like can be reduced.

In this configuration, the control portion may be configured to, when desired information is selected from information being displayed on the display apparatus via the operation portion, print/output the selected information by the print portion. With this configuration, a user can obtain advertisement information, a coupon attached to the advertisement information, and so on by operating the operation portion.

A configuration is also possible in which the display-integrated image forming apparatus of the present invention further includes a communications portion, and when desired information is selected via the operation portion, the control portion transmits the selected information to a portable terminal by the communications portion. With this configuration, the user can save, for example, a coupon attached to the advertisement information or the like in the memory of the portable terminal, and use the coupon by displaying the coupon on a display screen of the portable terminal whenever necessary.

Also, in the display-integrated image forming apparatus of the present invention, the operation portion may have a display portion, and the control portion may display various pieces of provided information managed by the server apparatus on both the display screen and the display portion. By displaying the same provided information on both the display screen and the display portion as just described, when a pedestrian outside the store who has viewed the information displayed on the display screen of the display apparatus enters the store and arrives in front of the image forming apparatus, the same information is displayed on the display portion of the operation portion, so the user can readily perform the subsequent select operations.

In this configuration, the control portion may be configured to display related information that is related to the provided information displayed on the display screen on the display portion. That is, by displaying, on the display portion, related information (e.g., information such as a product coupon in the case of the advertisement information being product information) that is related to the provided information (advertisement information) displayed on the display screen, the subsequent process, namely, a process for obtaining the coupon can be performed smoothly.

Also, in the display-integrated image forming apparatus of the present invention, a second display apparatus having a second display screen visible to an operator of the image forming apparatus may be disposed such that it protrudes above the case of the image forming apparatus, and the control portion may display various pieces of provided information managed by the server apparatus on both the display screen and the second display screen. By displaying the same provided information on both the display screen and the second display screen as just described, when a pedestrian outside the store who has viewed the information displayed on the display screen of the display apparatus enters the store and arrives in front of the image forming apparatus, the same information is displayed on the second display screen as well, so the user can readily perform the subsequent select operations.

In this configuration, the control portion may be configured to display related information that is related to the provided information displayed on the display screen on the second display screen. That is, by displaying, on the second display screen, related information (e.g., information such as a product coupon in the case of the advertisement information being product information) that is related to the provided information (advertisement information) displayed on the display screen, the subsequent process, namely, a process for obtaining the coupon can be performed smoothly.

Also, in the display-integrated image forming apparatus of the present invention, it is possible that the operation portion has a display portion, that a second display apparatus having a second display screen visible to an operator of the image forming apparatus is disposed such that it protrudes above the case of the image forming apparatus, and that the control portion displays various pieces of provided information managed by the server apparatus on each of the display screen, the second display screen and the display portion. By displaying the same provided information on each of the display screen, the second display screen and the display portion as just described, when a pedestrian outside the store who has viewed the information displayed on the display screen of the display apparatus enters the store and arrives in front of the image forming apparatus, the same information is displayed on the second display screen or the display portion of the operation portion, so the user can readily perform the subsequent select operations.

In this configuration, the control portion may be configured such that it displays related information that is related to the provided information displayed on the display screen on both the second display screen and the display portion. That is, by displaying, on both the second display screen and the display portion of the operation portion, related information (e.g., information such as a product coupon in the case of the advertisement information being product information) that is related to the provided information (advertisement information) displayed on the display screen, the subsequent process, namely, a process for obtaining the coupon can be performed smoothly.

Also, in the display-integrated image forming apparatus configured as described above, the control portion may be configured to display selection information (link, screen change, print, etc.) for selecting a piece of related information from the provided information displayed on the display screen, on the second display screen or the display portion. With this configuration, the subsequent process can be performed smoothly.

Also, in the display-integrated image forming apparatus configured as described above, aside from the operation portion, the second display screen may be used as a second operation portion, and operation may be possible from either or both of the operation portion and the second operation portion. With this configuration, usability for the user can be improved. In addition, the control portion may be configured to, when desired information is selected from the information being displayed on the display apparatus via the operation portion or the second operation portion, print/output the selected information by the print portion. A configuration is also adopted in which a communications portion is further provided, and when desired information is selected from the information being displayed on the display apparatus via the operation portion or the second operation portion, the control portion transmits the selected information to a portable terminal by the communications portion.

Also, in the display-integrated image forming apparatus configured as described above, the control portion may be configured to display the provided information being displayed on the display screen on the second display screen or the display portion in the form of thumbnail images. By displaying thumbnail images, selection operation efficiency can be facilitated for the user. That is, by selecting/operating a desired thumbnail image, the user can easily display related information indicated by the thumbnail image.

Also, in the display-integrated image forming apparatus configured as described above, the control portion may be configured to display image information set by an administrator of the apparatus by interrupting a display of various pieces of provided information obtained from the server apparatus and being displayed. In this case, the control portion can set a display layout, such as displaying the image information superimposed on the provided information or displaying the image information and the provided information side by side. This configuration can provide a display that is easy to view for customers or a display with impact. It is also possible that a time period during which interrupt display is performed can be set from the operation portion or the second operation portion. By allowing the administrator to freely set the interrupt time, it is possible to set the display time during which an interrupt image is displayed to an optimal length of time taking, for example, the number of people passing by the store during the time period of the day in which the interrupt image is displayed into consideration.

The image information can be any of image information of an original that has been captured by the original capturing portion, image data that has been inputted into the apparatus by the administrator and image data of a webpage that has been obtained via the network.

In this case, the provided information can be either moving image data or still image data. The control portion may be configured to, in the case where provided information transmitted from the server apparatus when displaying the provided information is moving image data, temporarily store the moving image data in a storage portion and display the moving image data on the display screen by reading the moving image data from the storage portion. As just described, in the case of moving image data, by temporarily storing the data in the storage portion and displaying it, the images can be displayed smoothly without the influence of data transfer from the external server apparatus. When, on the other hand, the provided information transmitted from the server apparatus when displaying the provided information is still image data, the control portion may be configured to display the data on the display screen without temporarily storing it in the storage portion. That is, in the case of still image data, because the data is not affected by data transfer from the external server apparatus, the data is displayed without being stored in the storage portion.

In the display-integrated image forming apparatus of the present invention, the provided information is managed based on POS data, climate data or regional/local data.

Also, an image display system of the present invention is an image display system in which the display-integrated image forming apparatus with the above configuration and a server apparatus are connected via a network, wherein the control portion transmits image information set by an administrator of the image forming apparatus to the server apparatus, and the server apparatus transmits the image information to the image forming apparatus such that the transmitted image information interrupts the various pieces of provided information managed by the server apparatus. In this case, the server apparatus may be configured to transmit the image information to the image forming apparatus so as to interrupt a display of the various pieces of provided information such that a display of the image information is displayed superimposed on the display of the various pieces of provided information, or may be configured to transmit the image information to the image forming apparatus to interrupt a display of the various pieces of provided information such that a display of various pieces of provided information and the display of the image information are displayed side by side.

That is, in the image display system of the present invention, the display-integrated image forming apparatus uploads image information as an interrupt image to the server apparatus, then the process of interrupting various pieces of provided information with the image information is performed on the server apparatus side, and the data obtained as a result of the interrupt process is transferred to the display-integrated image forming apparatus. Accordingly, the load of the interrupt process on the display-integrated image forming apparatus side can be reduced. That is, the display-integrated image forming apparatus can display the interrupt image by simply displaying the data transferred from the server apparatus after an interrupt process on the display screen or the like.

Also, an image display method of the present invention is an image display method in an image display system in which an image forming apparatus, in which a display apparatus that has a display screen visible from a back face or a side face of the image forming apparatus is disposed on at least the back face or one side face of a case of the image forming apparatus, and a server apparatus that manages various pieces of provided information displayed on the display screen are connected via a network, the method comprising the steps of: by the image forming apparatus, obtaining various pieces of provided information managed by the server apparatus; displaying the obtained various pieces of provided information on the display screen of the display apparatus; and when desired information is selected from the information being displayed on the display screen via an operation portion of the image forming apparatus, outputting the selected information. In the image display method of the present invention, it is possible that in the image forming apparatus, a second display apparatus having a second display screen that is visible to an operator of the image forming apparatus and serves as a second operation portion is disposed such that it protrudes above the case of the image forming apparatus, that the server apparatus manages various pieces of provided information displayed on the display screen and the second display screen, that in the step of displaying various pieces of provided information, the obtained various pieces of provided information is further displayed on the second display screen of the second display apparatus, and that in the step of outputting selected information, when desired information is selected from the information being displayed on the display screen via the operation portion and the second display screen of the image forming apparatus, the selected information is outputted.

Also, the image display method of the present invention further includes the steps of: transmitting image information set by an administrator to the server apparatus by the image forming apparatus; and transmitting, by the server apparatus, the image information to the image forming apparatus such that the transmitted image information interrupts the various pieces of provided information managed by the server apparatus. In this case, the method may further include a step of, by the server apparatus, transmitting the image information to the image forming apparatus to interrupt a display of provided information managed by the server apparatus such that a display of the image information is displayed superimposed on the display of provided information, or a step of, by the server apparatus, transmitting the image information to the image forming apparatus to interrupt a display of provided information managed by the server apparatus such that the display of provided information and a display of the image information are displayed side by side.

That is, according to the image display method of the present invention, the display-integrated image forming apparatus uploads image information to be used as an interrupt image to the server apparatus, the process of interrupting various pieces of provided information with the image information is performed on the server apparatus side, and the data obtained as a result of the interrupt process is transferred to the display-integrated image forming apparatus. Accordingly, the load of the interrupt process on the display-integrated image forming apparatus side can be reduced. That is, the display-integrated image forming apparatus can display the interrupt image by simply displaying the data obtained as a result of the interrupt process transferred from the server apparatus on the display screen or the like.

As described above, according to the present invention, by using an image forming apparatus also as a leg portion of the display apparatus, it is possible to fit two large devices, namely, the image forming apparatus and the display apparatus, substantially within the installation space of an image forming apparatus. Thus, even in a small store such as a convenience store or a supermarket, the display-integrated image forming apparatus of the present invention can be installed in about the same location as a conventional image forming apparatus. In this case, when the display apparatus is attached to the image forming apparatus such that the display screen faces outside, by only installing the image forming apparatus inside the store in a conventional manner, the display screen faces pedestrians outside the store through the street-side (i.e., the walkway-side) wall face glass. Accordingly, by displaying advertising information managed by the apparatus itself or by the external server apparatus on the display screen of this display apparatus, it is possible to provide publicity advertisements with impact to pedestrians outside the store. Also, by providing the display apparatus so as to be movable vertically and rotatable relative to the image forming apparatus, it is possible to place the display apparatus at an optimal height position and angle position for each store.

According to the present invention, it becomes possible for the external server apparatus to collectively store and manage data such as advertisements, so the storage capacity of the display-integrated image forming apparatus installed in a store or the like can be reduced. Also, because the external server apparatus collectively stores and manages data, the display control of the image forming apparatuses of the present invention installed in a plurality of stores can be performed collectively on the server apparatus side. With this configuration, it becomes possible to collectively display local limited information or the like on all of the display apparatuses installed in the stores located in the region, so effective distribution of local limited information also becomes possible.

BRIEF DESCRIPTION OF THE DRAWINGS

FIG. 2 shows an example in which a display-integrated image forming apparatus of the present invention is installed in a convenience store, with FIG. 2(a) being a perspective view, and FIG. 2(b) being a plan view.

FIGS. 13(a), 13(b), 13(c) and 13(d) are perspective views of display-integrated image forming apparatuses according to still another embodiment of the present invention, in which large-format displays are attached to the rear face and a side face of the case of an image forming apparatus.

FIGS. 18A(a), 18A(b) and 18A(c) are explanatory diagrams illustrating the procedure of a process for setting data to be displayed on a large-format display from a display panel.

FIGS. 18B(d), 18B(e) and 18B(f) are explanatory diagrams illustrating the procedure of a process for setting data to be displayed on a large-format display from a display panel.

DESCRIPTION OF THE PREFERRED EMBODIMENTS

Hereinafter, embodiments of the present invention will be described with reference to the accompanying drawings.

Figure 1:
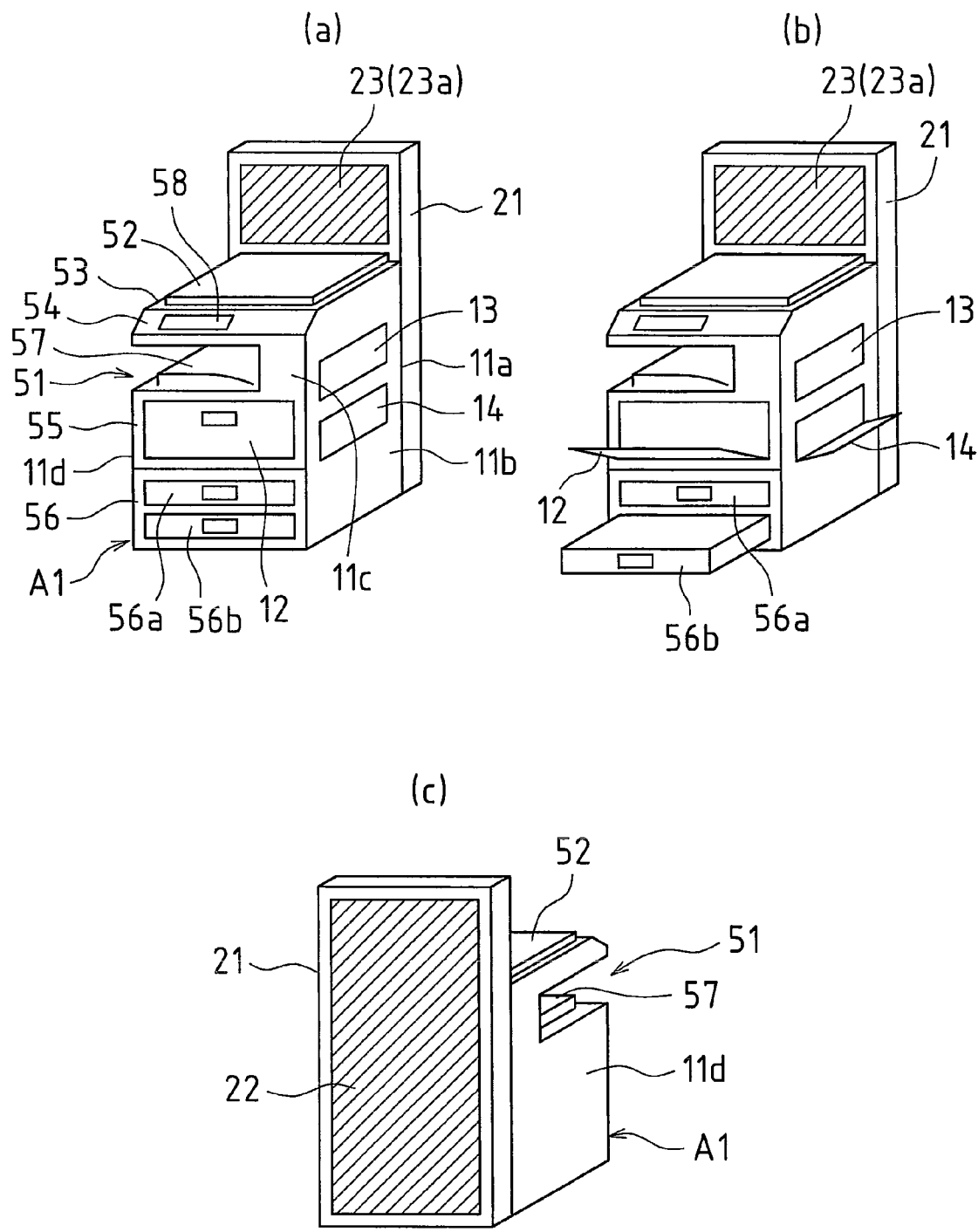
FIGS. 1(a), 1(b) and 1(c) are outer perspective views of a display-integrated image forming apparatus according to an embodiment of the present invention.

FIGS. 1(a), 1(b) and 1(c) are outer perspective views of a display-integrated image forming apparatus according to an embodiment of the present invention.

The image forming apparatus A1 is an image forming apparatus with an in-body paper discharge structure formed in a sideways U shape when viewed from the front. In the image forming apparatus A1, an original pressing lid 52, an original capturing portion 53, and a scanner portion 54 are disposed above an in-body paper discharge opening portion 51, and an image forming portion 55 and a paper supply portion 56 are disposed below the in-body paper discharge opening portion 51. Also, a keyboard-type and touch panel-type operation portion 58 is disposed on the front face of the original capturing portion 53.

That is, the image forming apparatus A1 is surrounded by a rear face case 11a formed in a rectangular shape, a right side face case 11b, an approximately rectangular front face case 11c where the in-body paper discharge opening portion 51 is notched in a sideways U shape, and a left side face case 11d, and the top of these case portions is covered by the scanner portion 54, which includes the original pressing lid 52 and the original capturing portion 53. Also, although not shown, casters are provided at each case bottom corner, so that the image forming apparatus can be freely moved by pushing.

The image forming apparatus A1 is a front access-type image forming apparatus in which, when an original is placed on the original capturing portion 53, when recording paper is drawn from a discharge tray 57 of the in-body paper discharge opening portion 51, and when recording paper is replenished in the paper supply portion 56, these activities can be performed from the front face of the image forming apparatus. Also, a front door 12 is provided immediately below the in-body paper discharge opening portion 51 of the front face case 11c, side doors 13 and 14 are provided at two locations above and below in the right side face case 11b, and respective paper cassettes 56a and 56b of the paper supply portion 56 are disposed so as to be capable of being pulled out to the front, below the front door 12. By opening the front door 12, it is possible to perform maintenance such as toner replenishment, exchanging of a photosensitive body, and repair or exchange of a fixing unit or a charging unit. Also, when removing jammed recording paper from a paper transport path, the side doors 13 and 14 are opened as necessary. However, other than disposing the discharge tray 57 in the in-body paper discharge opening portion 51, the configuration of such constituent portions disposed above and below the in-body paper discharge opening portion 51 is an example, and is not limited to this arranged configuration.

In the above configuration, in the present embodiment, a large-format display apparatus (display) 21, arranged so that the lengthwise direction of its screen is oriented vertically, is attached integrally to the rear face case 11a of the image forming apparatus A1, with a first display screen 22 facing toward the outside. That is, in the present embodiment, the image forming apparatus A1 is used as a leg portion of the large-format display 21. Thus, it is possible to fit two large devices, namely the image forming apparatus A1 and the large-format display 21, substantially within the installation space of the image forming apparatus A1. Also, because a connection cord between the image forming apparatus A1 and the large-format display 21 are not exposed to the outside, the appearance is neat, and there is no problem of the connection cord being pulled. However, strictly speaking, a space is necessary for the thickness of the large-format display 21 and the depth of a vertical movement mechanism portion and a rotation mechanism portion, described below. Thus, even in a small store such as a convenience store or a supermarket, installation of the display-integrated image forming apparatus of the present embodiment is possible in about the same location as the conventional installation of an image forming apparatus.

Also, the large-format display 21 is configured such that the top of the large-format display 21 protrudes above the case of the image forming apparatus A1. Specifically, the large-format display 21 is disposed such that it protrudes above the information rear face case 11a, and a first display screen 22 is disposed on an opposite face to a second display screen 23 disposed in the protruding portion. Although not absolutely necessary, it is better to provide the second display screen 23, in consideration of convenience for the user. Also, in the above embodiment, the first display screen 22 and the second display screen 23 of the large-format display 21 are provided as a single body, but they may also be separate.

FIG. 2 shows an example in which the display-integrated image forming apparatus configured as described above is installed in a convenience store, with FIG. 2(a) being a perspective view showing a state in which the image forming apparatus is installed in a convenience store and FIG. 2(b) being a partial plan view of the convenience store.

That is, in recent convenience stores, the section of the store that faces the street (walkway) is entirely encased in glass by a transparent glass window, and products are displayed such that people walking along the walkway can view and see the state of the inside of the store at a glance Specifically, in an ordinary arrangement pattern, a wide space-side glass window 501 and a narrow space-side glass window 502 are provided with an entrance 500 between them, a bookshelf 510 is placed along the wide space-side glass window 501, an image forming apparatus A1 is placed along the narrow space-side glass window 502, a register counter 503 is disposed behind the image forming apparatus A1 within the store, and product shelves 511 are disposed behind the bookshelf 510 within the store. In this case, the image forming apparatus A1 is disposed so that the first display screen 22 of the large-format display 21 attached to the rear face faces outside (i.e., the walkway outside the store). Thus, the first display screen 22 of the large-format display 21 faces pedestrians outside the store through the street-side (i.e., the walkway-side) glass window 502. Accordingly, by displaying advertising information on the first display screen 22 of the large-format display 21, it is possible to provide publicity advertisements with impact to pedestrians outside the store. In this case, the second display screen 23 may display the same information as the advertising information displayed on the first display screen 22 installed facing the walkway, or may display information (such as detailed information) related to the advertising information displayed on the first display screen 22. Thus, when a pedestrian interested in the advertising content of the first display screen 22 enters the store and arrives in front of the image forming apparatus A1, detailed information of the advertising content is displayed on the second display screen 23, so by operating a touch panel of the second display screen 23 or the operation portion 58 of the image forming apparatus A1, it is possible to perform printing or the like of desired information. For example, it is possible that information regarding the issuance of a coupon is displayed on the first display screen 22, and when a customer who has viewed this information enters the store and operates (touches) a coupon issue button displayed on the detailed information displayed on the second display screen 23, the image forming apparatus A1 prints and outputs a coupon.

Figure 3:
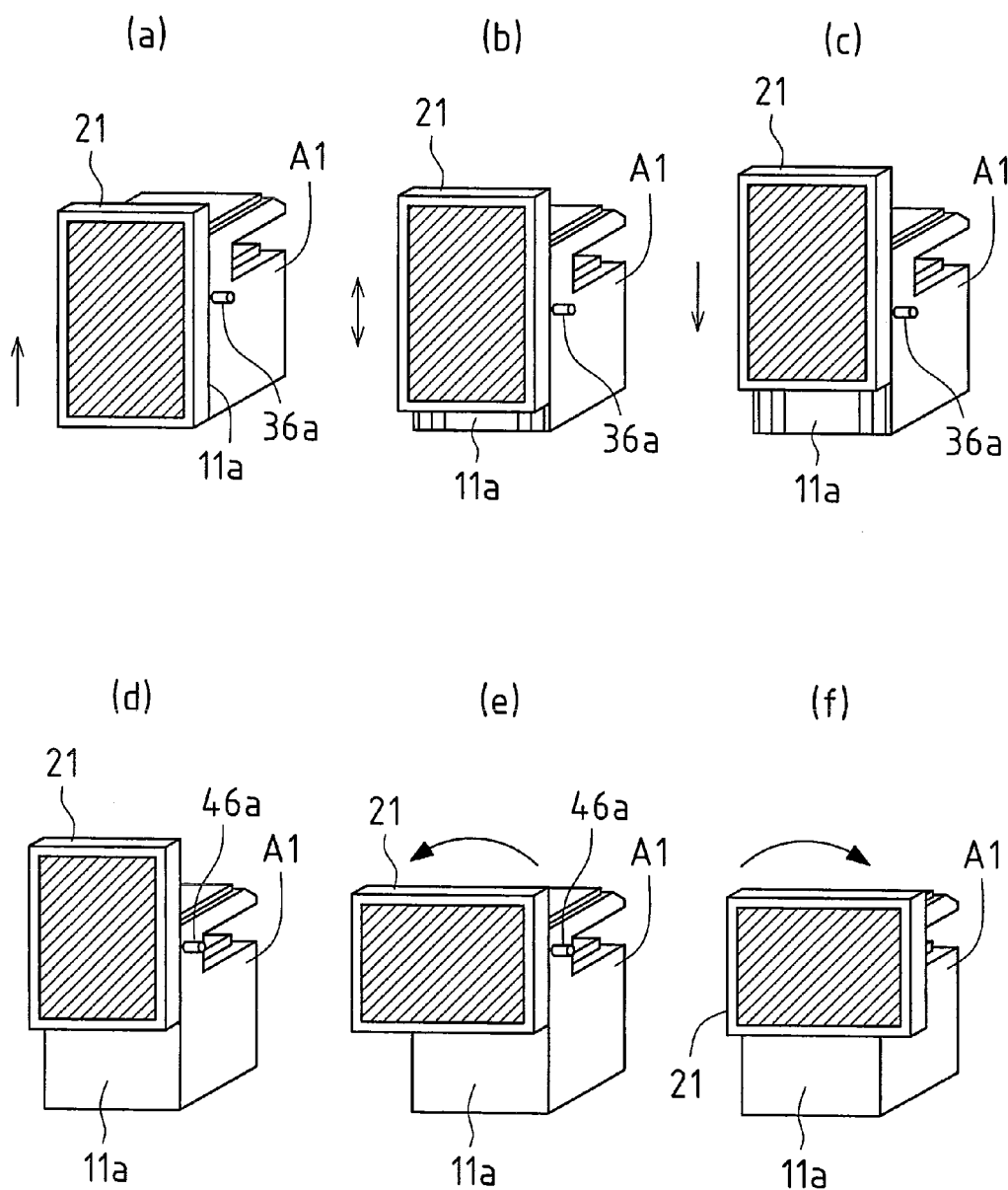
FIGS. 3(a), 3(b) and 3(c) are conceptual operation diagrams illustrating when a large-format display of an embodiment of the present invention is slidingly moved in the vertical direction relative to the rear face of the case of the image forming apparatus.
FIGS. 3(d), 3(e) and 3(f) are conceptual operation diagrams illustrating when the large-format display is rotated ±90 degrees along the rear face of the case of the image forming apparatus.

FIGS. 3(a), 3(b) and 3(c) are conceptual operation diagrams illustrating when the large-format display 21 of the present embodiment is slidingly moved in the vertical direction relative to the rear face case 11a of the image forming apparatus A1, and FIGS. 3(d), 3(e) and 3(f) are conceptual operation diagrams illustrating when the large-format display 21 is rotated ±90 degrees along the rear face case 11a of the image forming apparatus A1 in the horizontal direction.

Depending on the store in which the image forming apparatus A1 is installed, the bottom portion of the glass window 502 may be shielded from view, or other paper advertisements or the like may be posted. Therefore, by making it possible to adjust the height and possible to fix the height position as shown in FIGS. 3(a), 3(b) and 3(c), it is possible to install the large-format display 21 at an optimal height for each store. Likewise, depending on the store in which the image forming apparatus A1 is installed, it may be desired to install the large-format display 21 in a horizontal orientation instead of a vertical orientation. Accordingly, as shown in FIGS. 3(d), 3(e) and 3(f), by making the large-format display 21 rotatable along the case 11a of the image forming apparatus A1 and able to have its position fixed at a predetermined angle (90 degrees in this example), it is possible to adopt various installation modes according to store circumstances.

<Display Vertical Movement Mechanism Portion>

Figure 4:
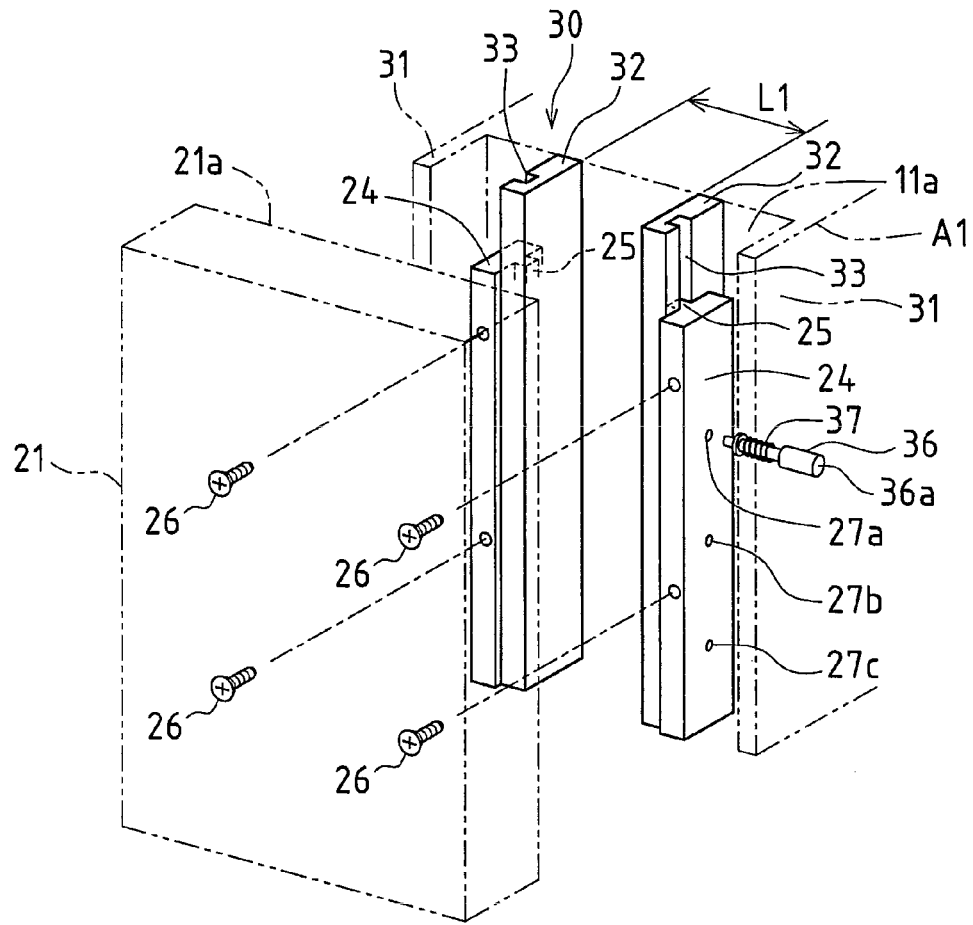
FIG. 4 is an exploded perspective view of a vertical movement mechanism portion.
Figure 5:
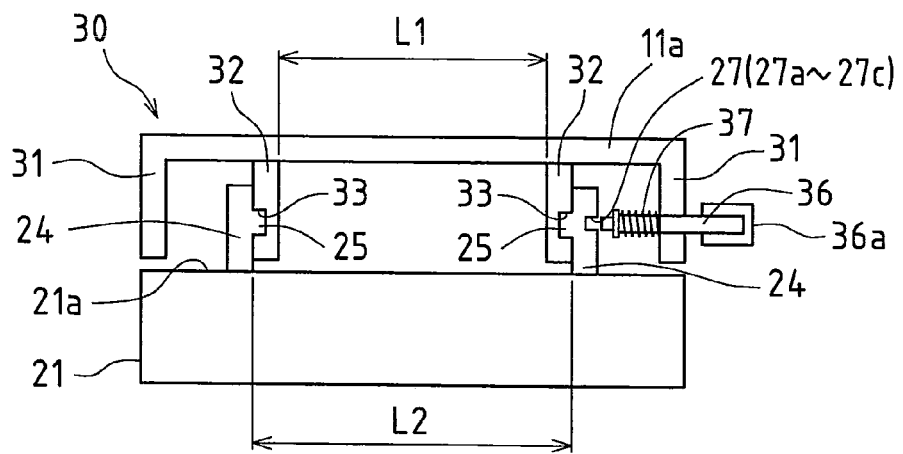
FIG. 5 is a cross-sectional view of the vertical movement mechanism portion as viewed from above.

Next, an example of the structure of a display vertical movement mechanism portion for allowing vertical sliding movement as shown in FIGS. 3(a), 3(b) and 3(c) will be described with reference to FIGS. 4 and 5. FIG. 4 is an exploded perspective view of a vertical movement mechanism portion 30, and FIG. 5 is a cross-sectional view of the vertical movement mechanism portion 30 as viewed from above.

On both the left and right sides of the rear face case 11a of the image forming apparatus A1, a pair of elongated holding plates 31 provided so as to protrude to the rear in parallel are integrally formed (or fixed by being attached with screws or the like), and a pair of elongated guide rail plates 32, provided so as to protrude to the rear in parallel with a predetermined gap L1 therebetween, are fixed by being integrally attached with screws (not shown) or the like to the rear face case 11a surrounded by the holding plates 31. In each of these guide rail plates 32, a single-row rail groove portion 33 that is continuous from the top end to the bottom end of the guide rail plate 32 is formed in an opposite face to the face where the guide rail plates 32 face each other (i.e., the face facing the holding plate 31).

On the other hand, on a rear face case 21a of the large-format display 21, a pair of elongated display-holding sliders 24, provided so as to protrude to the front in parallel with a predetermined gap L2 therebetween, are fixed by being attached with screws 26 or the like. In each of these display-holding sliders 24, a single-row rail protruding portion 25 that is continuous from the top end to the bottom end of the display-holding slider 24 is formed in the face where the display-holding sliders 24 face each other, and these rail protruding portions 25 fit together with each of the rail groove portions 33 of the guide rail plates 32, thus engaging so as to be capable of sliding movement in the vertical direction. In other words, the predetermined gaps L1 and L2 are set such that smooth sliding movement in the vertical direction is possible while maintaining engagement of the rail protruding portions 25 and the rail groove portions 33.

Also, a vertical movement fixing pin 36 for fixing the facing display-holding sliders 24 is provided in one of the holding plates (the right side holding plate in FIGS. 4 and 5) 31. This vertical movement fixing pin 36 is constantly biased in the direction of the display-holding slider 24 by a coil spring 37, and by engaging the vertical movement fixing pin 36 with any one of a plurality of fixing holes 27 (in this example, three fixing holes 27a, 27b, and 27c) that are formed on an outer face of the display-holding slider 24 that faces the pin, thus fixing the height position of the display-holding slider 24, it is possible to adjust the height position of the large-format display 21.

Here, an operation performed when changing the height position of the large-format display 21, for example, from the position shown in FIG. 3(a) to that shown in FIG. 3(b) will be described.

First, a handle portion 36a of the vertical movement fixing pin 36 provided in the holding plate 31 is pulled to elastically compress the coil spring 37, thus disengaging the vertical movement fixing pin 36 from the fixing hole 27a of the display-holding slider 24. Thus, the display-holding slider 24 becomes capable of sliding movement. Next, in a state with the handle portion 36a of the vertical movement fixing pin 36 pulled, the large-format display 21 is raised to the position shown in FIG. 3(b), and pulling of the handle portion 36a of the vertical movement fixing pin 36 is released. When doing so, due to the biasing force (elastic resilience) of the coil spring 37 provided on the vertical movement fixing pin 36, the vertical movement fixing pin 36 engages with the fixing hole 27b of the display-holding slider 24, and the large-format display 21 is fixed at the position in FIG. 3(b).

Note that in the above-described operation, the handle portion 36a is continuously pulled from the time that engagement of the vertical movement fixing pin 36 is removed from the fixing hole 27a of the display-holding slider 24 to the time that the vertical movement fixing pin 36 is engaged in the next fixing hole 27b, but a configuration may also be adopted in which after engagement of the vertical movement fixing pin 36 is removed from the fixing hole 27a, pulling of the handle portion 36a is released once the display-holding slider 24 has been slid slightly upward. Thus, when the display-holding slider 24 is slowly raised, when the tip of the vertical movement fixing pin 36 matches the next fixing hole 27b, the vertical movement fixing pin 36 is automatically engaged with the fixing hole 27b due to the biasing force (elastic resilience) of the coil spring 37.

<Display Rotation Mechanism Portion>

Figure 6:
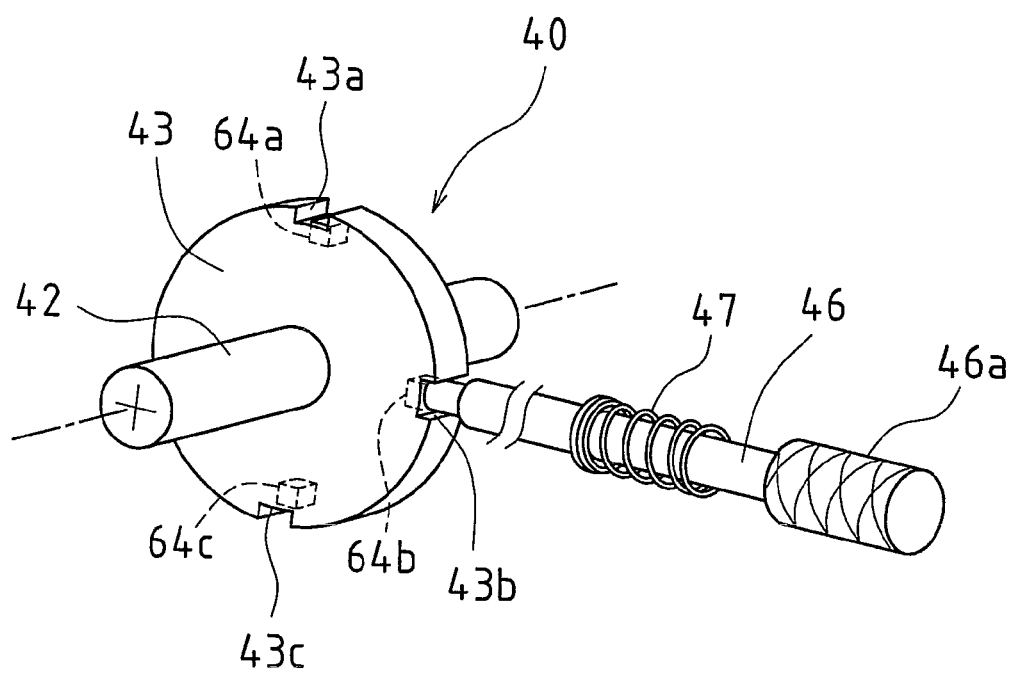
FIG. 6 is a perspective view of relevant parts of a rotational movement mechanism portion.
Figure 7:
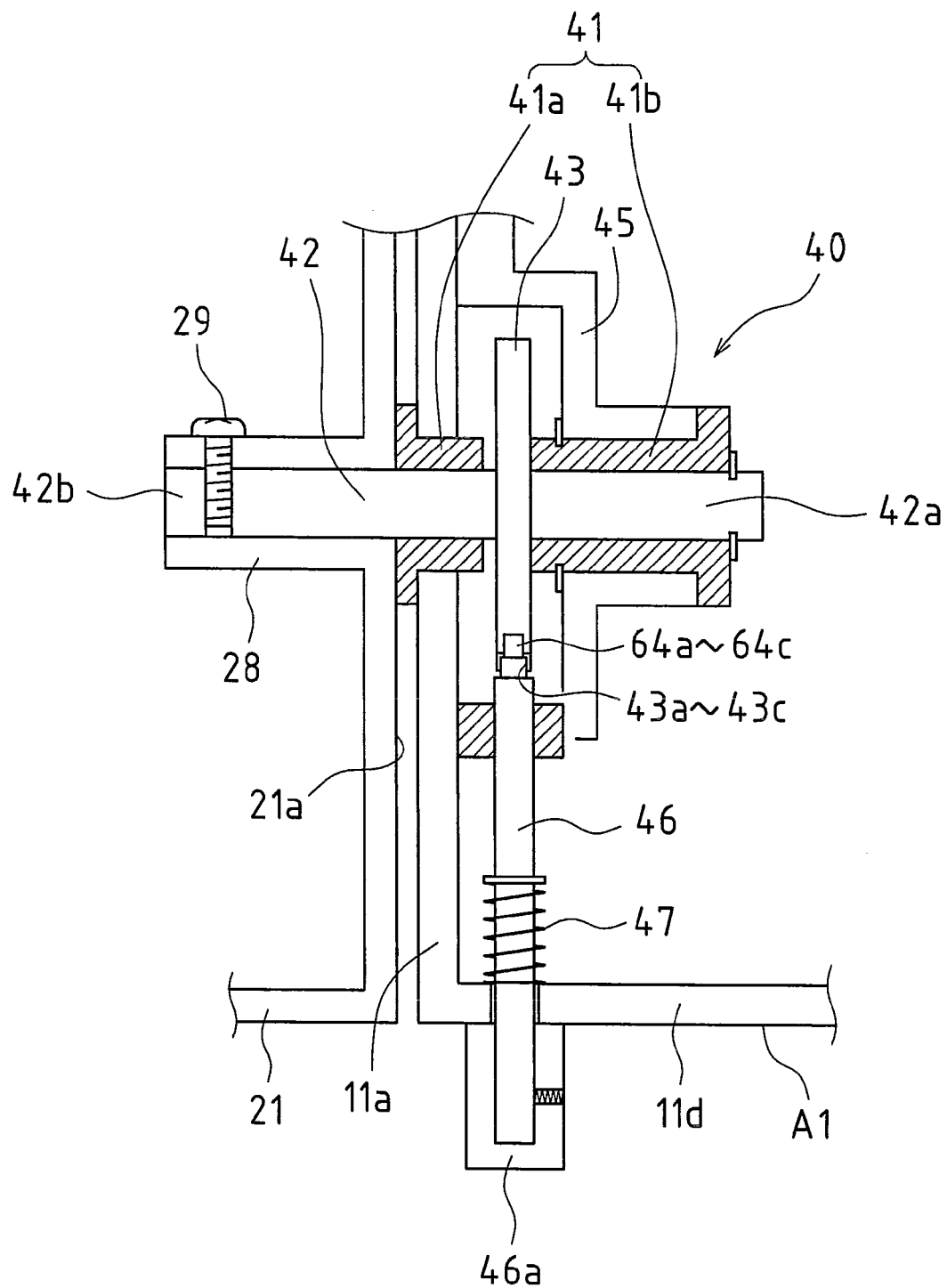
FIG. 7 is a cross-sectional view of the rotational movement mechanism portion as viewed from above.

Next, an example of the structure of a display rotational movement mechanism portion for allowing rotational movement as shown in FIGS. 3(d), 3(e) and 3(f) will be described with reference to FIGS. 6 and 7. FIG. 6 is a perspective view of relevant parts of a rotational movement mechanism portion 40, and FIG. 7 is a cross-sectional view of the rotational movement mechanism portion 40 as viewed from above.

The large-format display 21 provided in the rear face case 11a of the image forming apparatus A1, as shown in FIGS. 3(d), 3(e) and 3(f), can be held in an orientation desired by a user by rotating the large-format display 21 clockwise ±90 degrees from a vertical display state (FIG. 3(d)) to a horizontal display state (FIGS. 3(b), 3(c)).

The rotational movement mechanism portion 40 of the present embodiment for realizing such a rotational movement has a structure in which one end portion 42a of a rotating shaft 42 is supported by a bearing portion 41 provided in the rear face case 11a of the image forming apparatus A1, and the rear face case 21a of the large-format display 21 is supported and fixed by another end portion 42b of the rotating shaft 42. A cylindrical holding portion 28 for supporting and fixing the other end portion 42b of the rotating shaft 42 is provided in the rear face case 21a of the large-format display 21, and in a state with the other end portion 42b of the rotating shaft 42 inserted through the holding portion 28, by fastening with a screw 29 or the like to the rotating shaft 42 from the outer circumferential face of the holding portion 28, the large-format display 21 is supported and fixed integrally to the rotating shaft 42.

The bearing portion 41 provided in the rear face case 11a of the image forming apparatus A1 is configured of a first bearing portion 41a supported and fixed by the rear face case 11a and a second bearing portion 41b supported and fixed by a bearing support plate 45 provided within the rear face case 11a, and the one end portion 42a of the rotating shaft 42 is supported by the first bearing portion 41a and the second bearing portion 41b. A rotating disk 43 is provided integrated with the rotating shaft 42 between the first bearing portion 41a and the second bearing portion 41b, and in the circumferential portion of the rotating disk 43, and a pin groove 43a, a pin groove 43b, and a pin groove 43c are provided at 90 degree intervals.

A rotation fixing pin 46 for fixing the rotation position of the rotating shaft 42 is provided in the left side face case 11d of the image forming apparatus A1. This rotation fixing pin 46 is constantly biased in the direction of the rotating disk 43 by the coil spring 47, and by engaging the rotation fixing pin 46 in any one of the three pin grooves 43a to 43c provided in the circumferential portion of the rotating disk 43 to fix the rotation position (i.e., the rotation position of the rotating shaft 42) of the rotating disk 43, as shown in FIGS. 3(d), 3(e) and 3(f), it is possible to hold the large-format display 21 at a clockwise 0 degrees position, a clockwise 90 degrees position, or a clockwise −90 degrees position.

Here, an operation performed when rotating the rotation angle position of the large-format display 21 from the clockwise 0 degrees position (the position shown in FIG. 3(d)) to the clockwise −90 degrees position (the position in FIG. 3(e)) will be described.

First, a handle portion 46a of the rotation fixing pin 46 provided in the left side face case 11d of the image forming apparatus A1 is pulled to elastically compress the coil spring 47, thus disengaging the rotation fixing pin 46 from the pin groove 43b of the rotating disk 43. Thus, the rotating shaft 42 becomes capable of rotational movement. Next, in a state with the handle portion 46a of the rotation fixing pin 46 pulled, the large-format display 21 is rotated clockwise −90 degrees to the position shown in FIG. 3(e), and pulling of the handle portion 46a of the rotation fixing pin 46 is released. When doing so, due to the biasing force (elastic resilience) of the coil spring 47 provided on the rotation fixing pin 46, the rotation fixing pin 46 engages with the pin groove 43c of the rotating disk 43, and the large-format display 21 is fixed at the position shown in FIG. 3(e).

Likewise, in a state with the handle portion 46a of the rotation fixing pin 46 pulled to elastically compress the coil spring 47, thus disengaging the rotation fixing pin 46 from the pin groove 43b of the rotating disk 43, when the large-format display 21 is rotated clockwise +90 degrees to the position shown in FIG. 3(f), the rotation fixing pin 46 engages with the pin groove 43a of the rotating disk 43.

Note that in the above-described operation, the handle portion 46a is continuously pulled from the time that the rotation fixing pin 46 is disengaged from the pin groove 43b of the rotating disk 43 to the time that the rotation fixing pin 46 is engaged in the next pin groove 43c, but a configuration may also be adopted in which after the rotation fixing pin 46 is disengaged from the pin groove 43b, pulling of the handle portion 46a is released once the rotating shaft 42 has been slightly rotated in the counterclockwise direction. Thus, when the rotating shaft 42 is further rotated in the counterclockwise direction, and when the tip of the rotation fixing pin 46 matches the next pin groove 43c, the rotation fixing pin 46 is automatically engaged with the pin groove 43c due to the biasing force (elastic resilience) of the coil spring 47.

Figure 8:
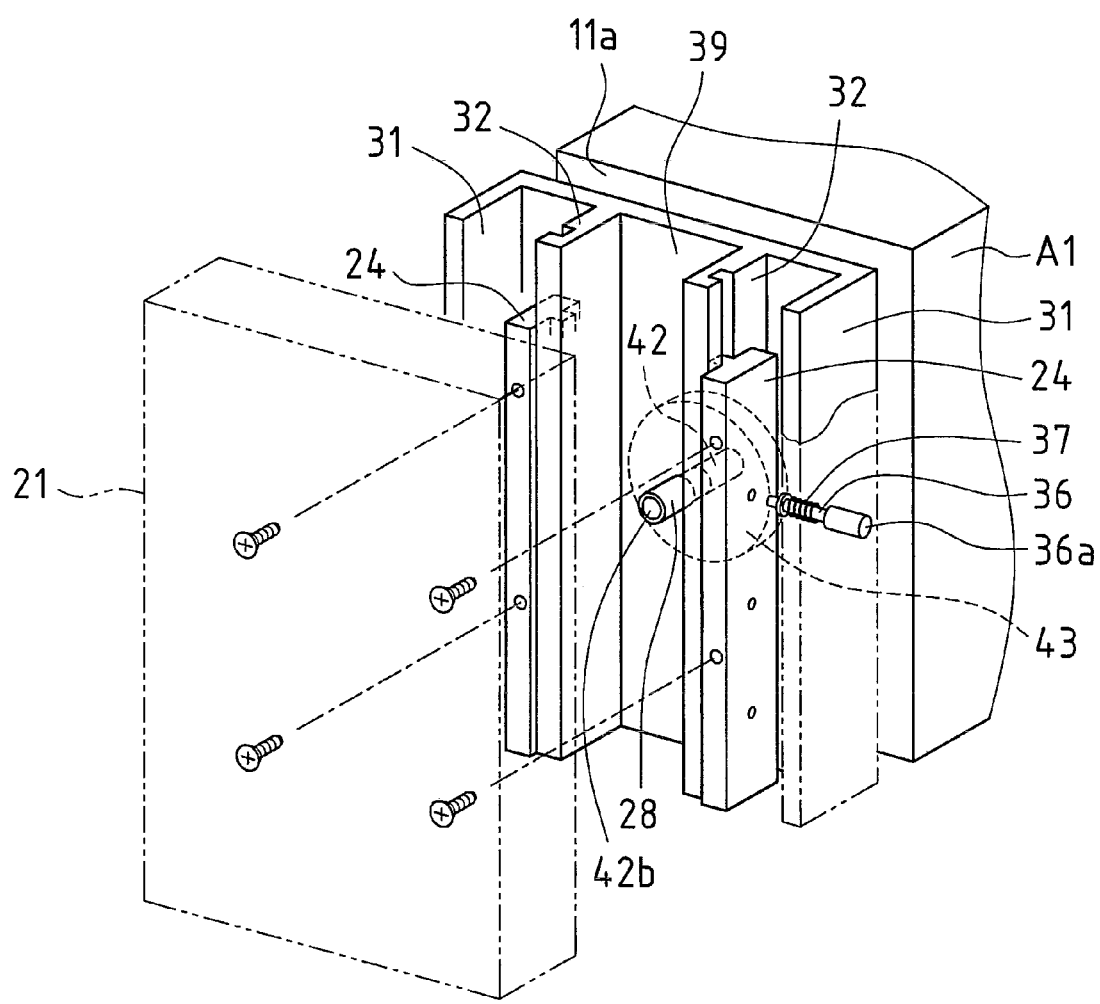
FIG. 8 is an exploded perspective view of relevant parts when the vertical movement mechanism portion and the rotation mechanism portion are integrated.

In the above description of the mechanism portions, an example was described in which the display vertical movement mechanism portion 30 and the display rotation mechanism portion 40 are separately provided, but these mechanism portions may also be provided as a single body. FIG. 8 is an exploded perspective view of relevant parts when the display vertical movement mechanism portion 30 and the display rotation mechanism portion 40 are provided as a single body.

When only the display vertical movement mechanism portion 30 is provided, as shown in FIG. 4, the holding plates 31 and the guide rail plates 32 are directly fixed to the rear face case 11a of the image forming apparatus A1, but in FIG. 8, the holding plates 31 and the guide rail plates 32 are fixed to a vertical movement base plate 39, and the vertical movement base plate 39 is supported by and fixed to the other end portion 42b of the rotating shaft 42 shown in FIGS. 6 and 7. Thus, the vertical movement shown in FIGS. 3(a), 3(b) and 3(c) can be performed in combination with the rotational movement shown in FIGS. 3(d), 3(e) and 3(f), so it is possible to realize a flexible arranged configuration according to the installation conditions of each store.

Next is a description of other embodiments of various arranged configurations, the shape of the large-format display 21, and the like of the display-integrated image forming apparatus of the present invention. For example, in FIGS. 3(d), 3(e), and 3(f), the center of rotation is slightly below the center of the large-format display 21. Therefore, when the large-format display 21 is rotated, as shown in FIGS. 3(e) and 3(f), one side of the large-format display 21 protrudes from the horizontal width of the back face case 11a of the image forming apparatus A1. However, in a convenience store or the like where normally copies are provided for a fee, a money-accepting apparatus therefor is provided beside the image forming apparatus A1. Accordingly, as long as the protruding width of the large-format display 21 is about the same as the installment width of such a money-accepting apparatus, no problem arises when the large-format display 21 is held in a horizontal orientation.

Figure 9:
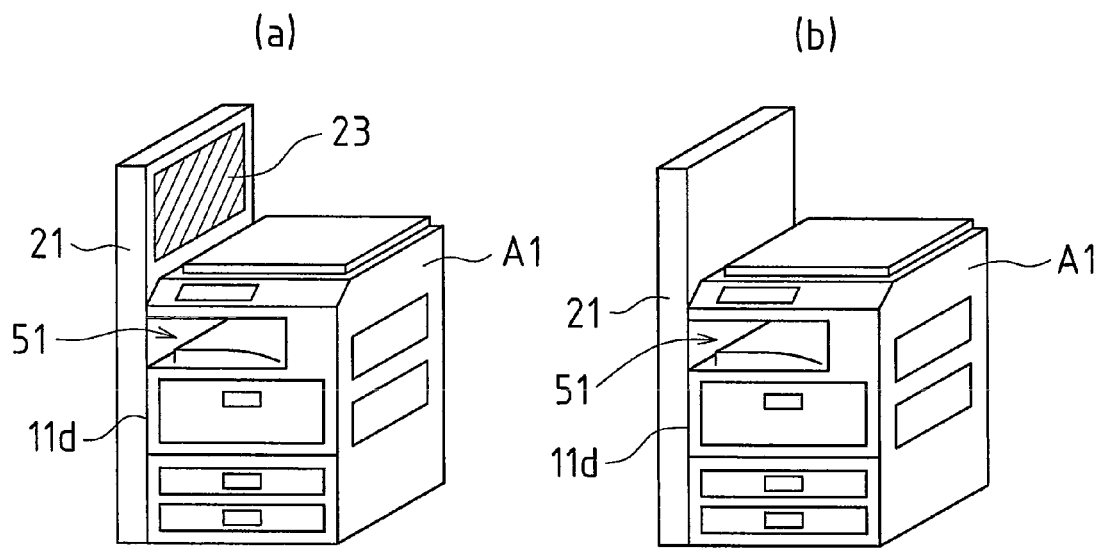
FIGS. 9(a) and 9(b) are perspective views of display-integrated image forming apparatuses according to another embodiment of the present invention, in which a large-format display is attached to one side face of the case of an image forming apparatus.

Also, in the above embodiment, an example was described in which the large-format display 21 is attached to the rear face of the image forming apparatus A1, but as long as there is no obstruction to original capturing, taking paper from a discharge tray, replenishing recording paper in a paper cassette, opening/closing doors for maintenance or the like, the large-format display 21 may be attached to, for example, the one side face case 11d of the image forming apparatus A1, as shown in FIGS. 9(a) and 9(b). FIG. 9(a) shows an example in which a second display screen 23 is provided, and FIG. 9(b) shows an example in which the second display screen 23 is not provided.

Figure 10:
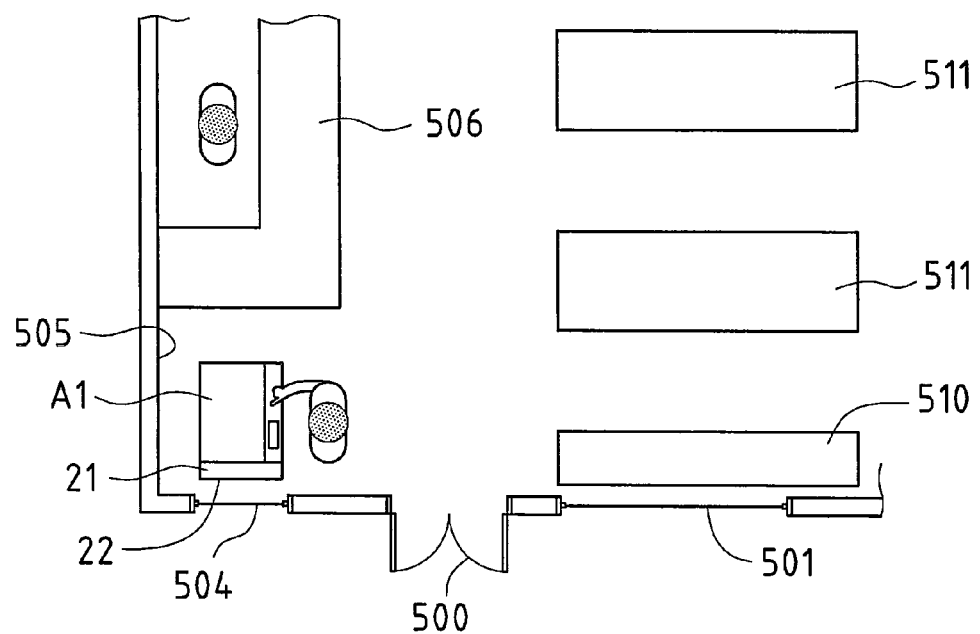
FIG. 10 is a plan view showing an example in which a display-integrated image forming apparatus with a large-format display attached to a side face of the case is installed in a convenience store.

FIG. 10 shows an example in which the image forming apparatus A1 shown in FIG. 9(a) or 9(b) is installed in a convenience store. In this example, along a narrow space-side glass window 504 next to an entrance 500, the image forming apparatus A1 is installed in a horizontal orientation relative to the glass window 504 such that the first display screen 22 of the large-format display 21 attached to the side face faces outside (i.e., the walkway outside the store). That is, the image forming apparatus A1 is installed such that the rear face of the image forming apparatus A1 faces a wall 505. Such an installation mode is effective when an adequate space where a user can operate the image forming apparatus A1 cannot be secured between the glass window 504 and a register counter 506, and this installation mode becomes possible by attaching the large-format display 21 to a side face of the image forming apparatus A1.

Figure 11:
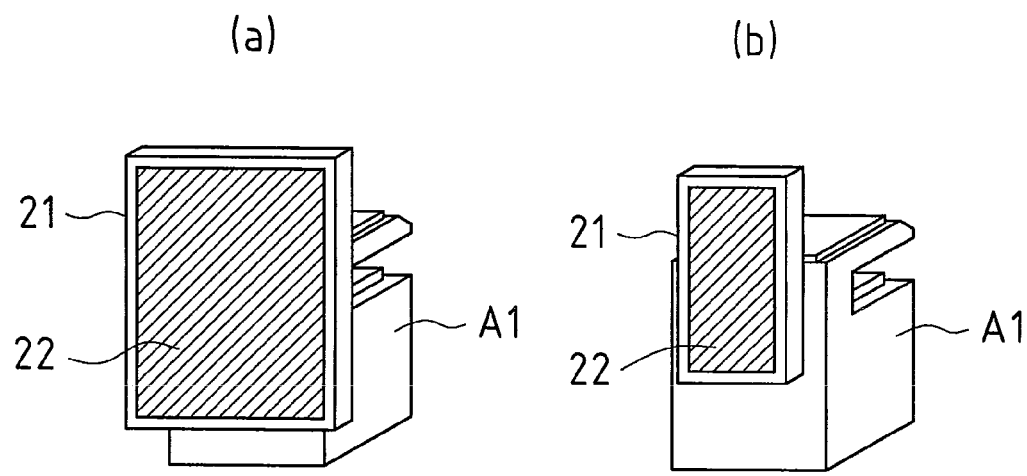
FIGS. 11(a) and 11(b) are perspective views of display-integrated image forming apparatuses according to still another embodiment of the present invention, in which a large-format display is attached to the rear face of the case and a side face of the case of an image forming apparatus.

Furthermore, in the above embodiment, the width of the large-format display 21 when installed vertically is the same as the width of the image forming apparatus A1, but these widths may not necessarily be the same. For example, as shown in FIG. 11(a), the width of the large-format display 21 may be slightly more than the width of the image forming apparatus A1, or as shown in FIG. 11(b), the width of the large-format display 21 may be slightly less than the width of the image forming apparatus A1.

Figure 12:
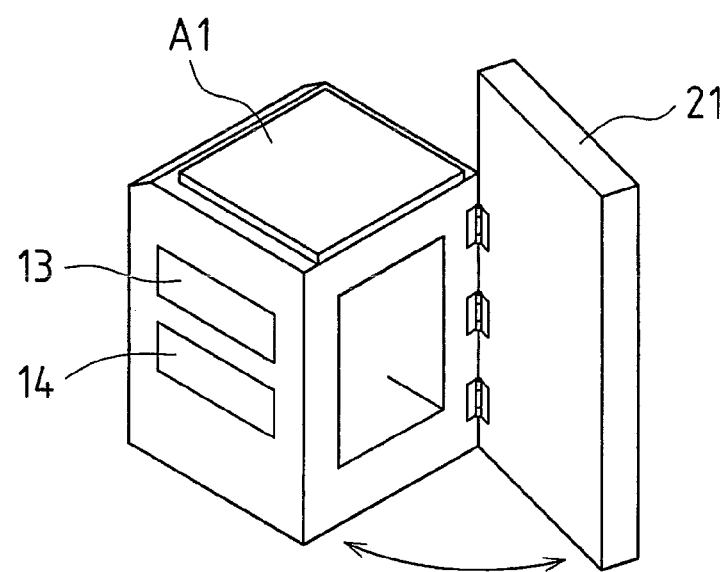
FIG. 12 is a perspective view showing an example in which a large-format display is also used as an opening/closing door.

Also, the large-format display 21 can also be used as an opening/closing door that opens/closes one side face of the image forming apparatus A1. For example, by supporting one side of the back face case 11*a* of the image forming apparatus A1 and one side of the back face of the large-format display 21 with a hinge or the like such that opening/closing is possible, as shown in FIG. 12, it becomes possible to open/close the back face side of the image forming apparatus A1. Thus, when performing maintenance, when recording paper has become jammed in the transport path, or the like, by opening the large-format display 21, it is easy to perform maintenance work or remove jammed paper. Also, by using the large-format display 21 also as a door that opens the inside of the image forming apparatus A1, it is possible to omit the conventional side doors 13 and 14.

Also, in the above embodiment, an example was described in which the large-format display 21 is attached to the rear face case 11*a* or the side face case 11*d* of the image forming apparatus A1, but the large-format display 21 may be attached to, for example, the rear face case 11*a* and the side face case 11*d* of the image forming apparatus A1, as shown in FIGS. 13(*a*) to 13(*d*). FIG. 13(*a*) shows an example in which there is a second display screen 23 in a large-format display 21*a* attached to the rear face case 11*a*, and there is not a second display screen in a large-format display 21*b* attached to the side face case 11*d*, and FIG. 13(*b*) shows an example in which there is not a second display screen 23 in the large-format display 21*a* attached to the rear face case 11*a*, and there is a second display screen in the large-format display 21*b* attached to the side face case 11*d*. Furthermore, although the second display screen 23 is provided in either the large-format display 21*a* or the large-format display 21*b*, the second display screen 23 may be provided in both the large-format display 21*a* and the large-format display 21*b*, or may be not provided in either the large-format display 21*a* or the large-format display 21*b*.

Figure 14:
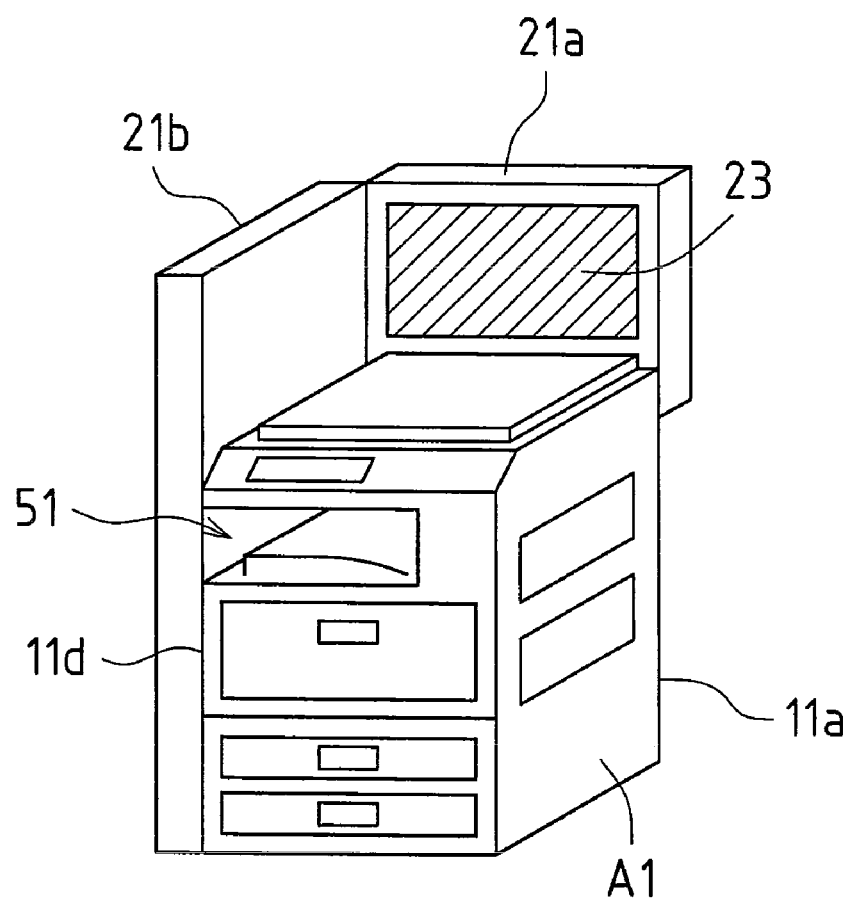
FIG. 14 is a perspective view of a display-integrated image forming apparatus according to still another embodiment of the present invention, in which a large-format display is disposed on a side face of the case of an image forming apparatus and a second display screen is disposed such that the second display screen protrudes from the back face of the image forming apparatus.

In the above example, the second display screen is disposed on an opposite face to the display screen of the large-format display 21, but it is also possible to, for example, dispose the large-format display 21 on a side face case of the image forming apparatus A1 and dispose the second display screen such that it protrudes from the back face of the image forming apparatus A1 as shown in FIG. 14.

<System Configuration of Display-Integrated Image Forming Apparatus of Present Embodiment>

Figure 15:
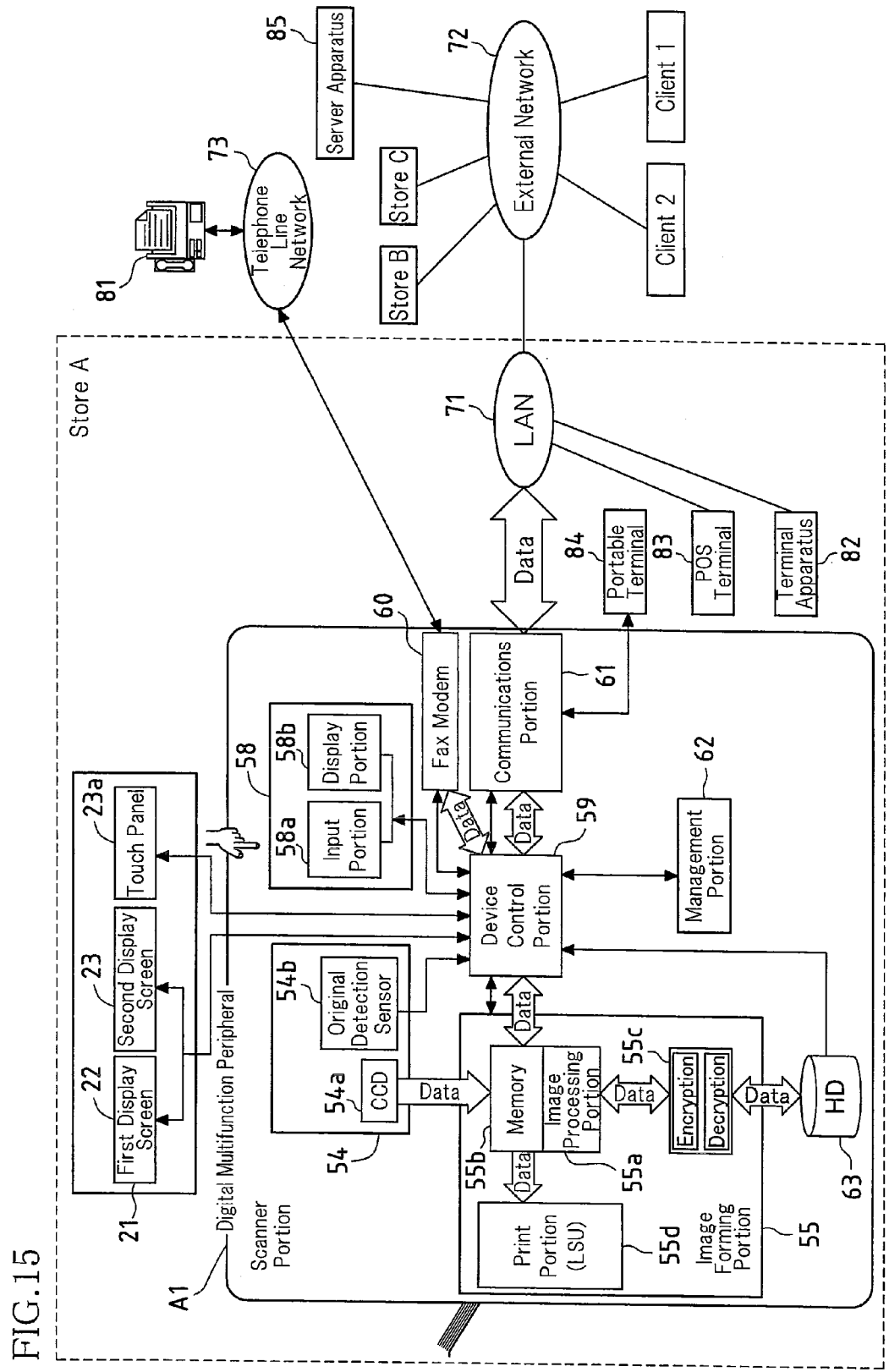
FIG. 15 is a block diagram illustrating an electrical configuration when a display-integrated image forming apparatus of the present invention is applied to a digital multifunction peripheral.

The present embodiment describes an example in which a display-integrated image forming apparatus configured as described above is applied to a digital multifunction peripheral. FIG. 15 shows an overview of the electrical configuration of such a digital multifunction peripheral, and shows a connection relationship between the digital multifunction peripheral and an external server apparatus 85 that manages display information.

First of all, the electrical configuration of the digital multifunction peripheral (image forming apparatus) A1 will be described.

As shown in FIG. 15, the digital multifunction peripheral A1 is provided with a scanner portion 54, an operation portion 58, an image forming portion 55, a device control portion 59, a fax modem 60, a communications portion 61, a management portion 62, and a hard disk (HD) 63. That is, the digital copier of the present embodiment A1 is a multifunction peripheral having a fax machine and a network printer.

The scanner portion 54 is provided with a CCD 54*a*, an original detection sensor 54*b*, and so on.

The operation portion 58 is provided with an input portion 58*a* configured of a touch panel described later and various function buttons that are mechanical keys, and the like, and a display portion 58*b* configured of a display panel of liquid crystal or the like.

Figure 17:
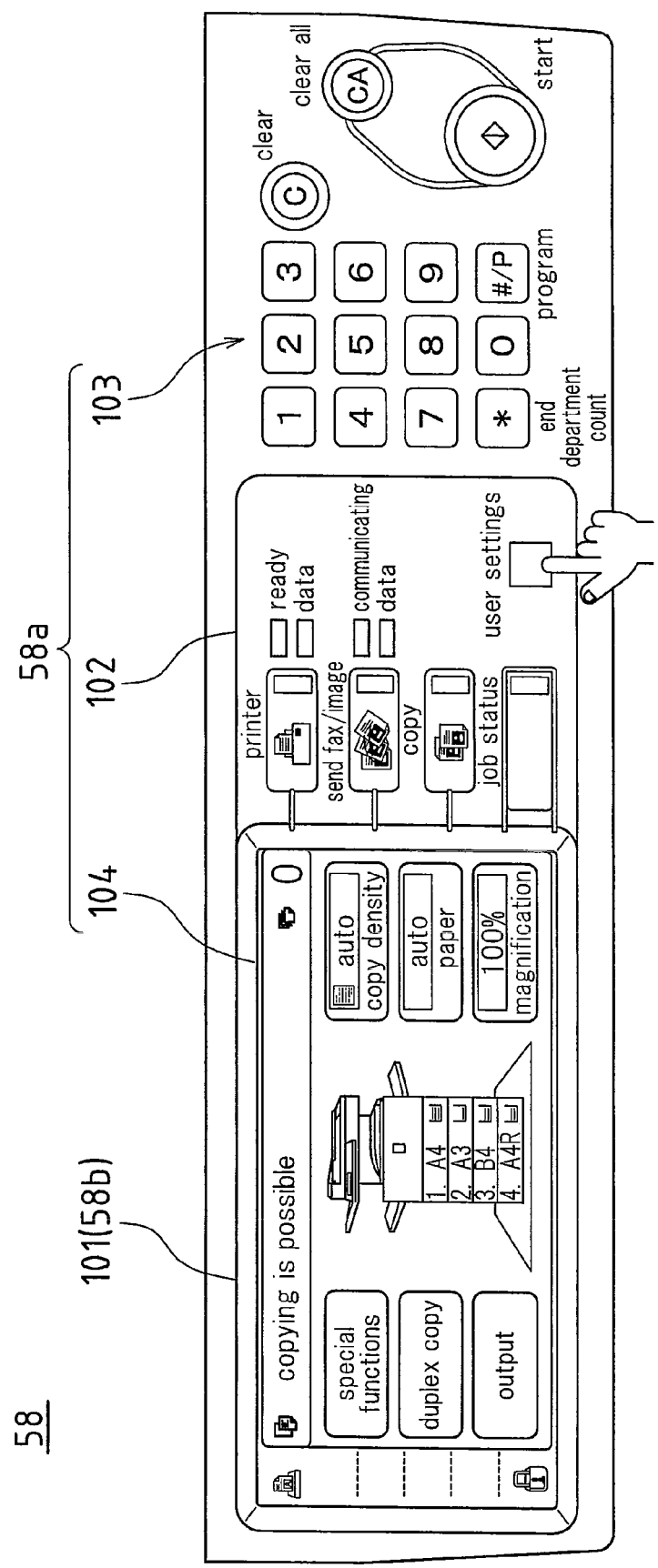
FIG. 17 is an explanatory diagram illustrating a configuration of an operation portion.

FIG. 17 shows a configuration of the operation portion 58.

The display portion 58*b* has a structure in which a transparent touch panel 104 is disposed on the upper face of a display panel 101, and various function buttons 102 and a numeric keypad 103 are disposed to the side (to the right side in FIG. 17) of the display portion 58*b*. Furthermore, a start button, a clear all (CA) button, and a clear (C) button are disposed to the right side of the numeric keypad 103.

The image forming portion 55 is provided with an image processing portion 55*a* that has a work memory 55*b* where print data is decompressed; an encryption/decryption portion 55*c* that encrypts data transmitted from outside in order to protect the data in a device, and temporarily saves (stores) the encrypted data to the hard disk 63, and also decrypts the data saved to the hard disk 63 and transfers the decrypted data to the image processing portion 55*a*; a print portion 55*d* that has a laser scanning unit (LSU); and the like. Here, the print portion 55*d* is not limited to an electrophotographic system, and is applicable in various forms, such as an inkjet system or a heat transfer system.

The device control portion 59 manages the operational control of devices, and is configured of a CPU, a ROM, a RAM, and the like. As display control, other than display control of the display portion 58*b*, the device control portion 59 also controls the display of the first display screen 22 and the second display screen 23 of the large-format display 21.

The management portion 62 manages information necessary for device operation, and for example, with respect to sending and receiving, performs management of mail addresses and fax telephone numbers, and the like. Also, the management portion 62 performs overall management of the information necessary for device operation such as management of location information (address information) of data temporarily saved to the hard disk 63, management of location information of data outputted to the printer when operating in a printer mode, and the like.

Also, in the present embodiment, the management portion 62 manages the order, time, and the like for displaying various display data stored in the hard disk 63 on the first display screen 22 and the second display screen 23 of the large-format display 21 when interrupt display, which will be described later, is performed on the large-format display 21.

The communications portion 61 performs bidirectional communications between a LAN 71 and an external network 72, and, in the present embodiment, is a printer board provided with a memory for decompressing received data into data handled by a device. Accordingly, with the communications portion 61, received data is, while decompressed in this memory, sequentially transferred to the work memory 55*b*.

In the digital multifunction peripheral A1 with the above configuration, a facsimile apparatus 81 can be connected to the fax modem 60 via a telephone line 73. Also, a terminal apparatus (personal computer) 82, a POS terminal 83, and the like can be connected to the communications portion 61 via the LAN 71, and a portable terminal 84 can also be connected to the communications portion 61 via a wireless connection. The communications portion 61 is also capable of being connected to the external server apparatus 85 via the external network 72 and to external branch stores (Store B and Store C) and the like. A client 1 and a client 2 are also connected to the external network 72 to request that the server apparatus 85 display advertisements and the like. The digital multifunction peripheral A1 of the present embodiment is disposed in such a network environment.

The various information displayed on the first display screen 22 and the second display screen 23 of the large-format display 21, display order, display time and the like are basically managed by the external server apparatus 85.

In the above embodiment, one large-format display 21 is installed in Store A, but a configuration is also possible in which a plurality of large-format displays 21 are installed, and the external server apparatus 85 performs the display management of these large-format displays 21.

Figure 16:
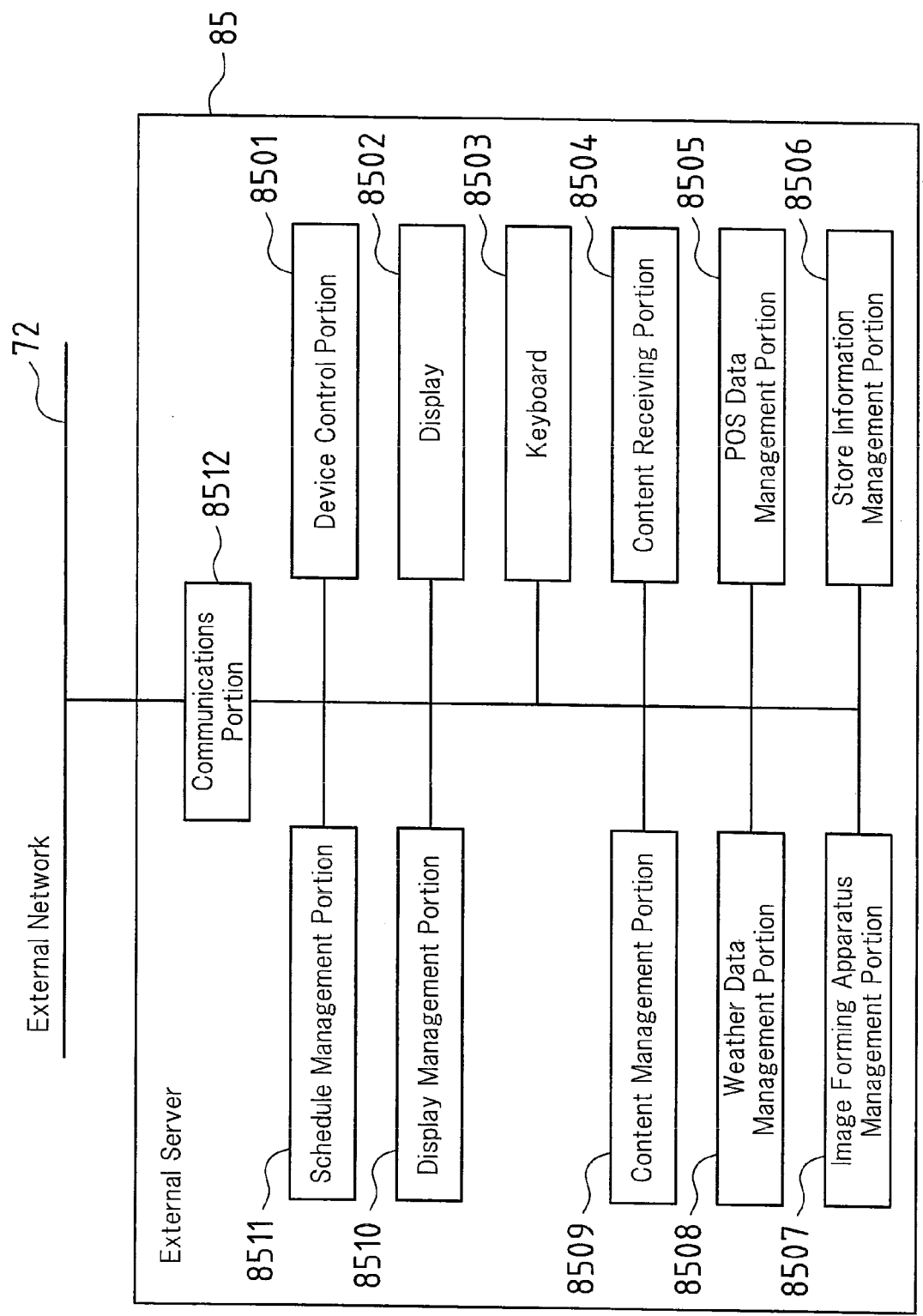
FIG. 16 is a block diagram illustrating an electrical configuration of a server apparatus.

FIG. 16 shows an overview of the electrical configuration of the server apparatus 85.

The server apparatus 85 is provided with a device control portion 8501, a display 8502, a keyboard 8503, a content receiving portion 8504, a POS data management portion 8505, a store information management portion 8506, an image forming apparatus management portion 8507, a weather data management portion 8508, a content management portion 8509, a display management portion 8510, a schedule management portion 8511, and a communications portion 8512.

The device control portion 8501 manages the operation control of the whole server apparatus, and is configured of a CPU, a ROM, a RAM (not shown) and so on.

The display 8502 displays the state and the like of a display apparatus and an image forming apparatus of each store that are managed by the server apparatus 85.

The keyboard 8503 is used to input control instructions and the like to a display apparatus of each store from the server apparatus 85.

The content receiving portion 8504 receives display information such as advertisement information, coupon information and the like requested by the client 1, the client 2 and the like via the external network 72, display request information from each store, or information and the like directly inputted into the server apparatus 85.

The POS data management portion 8505 receives and manages information from the POS terminal 83 of each store.

The store information management portion 8506 stores and manages regional/local information, such as regional/local events, inputted from the terminal apparatus 82 of each store.

The image forming apparatus management portion 8507 stores and manages the counter information and operation status of the image forming apparatus.

The weather data management portion 8508 obtains and manages information sent from an organization that manages weather information (not shown) such as the Meteorological Agency via the external network 72.

The content management portion 8509 stores the information received by the content receiving portion 8504.

The display management portion 8510 manages split-screen display, superimposition display and the like of the display screen of the display apparatus of each store.

The schedule management portion 8511 stores and manages the display order, display time and the like of the information stored in the content management portion 8509 for each store in which a large-format display 21 has been installed. The schedule management portion 8511 also manages the change of displayed advertisement content based on the information of each store stored in the POS data management portion 8505 such as product sales status, the type of customers who purchased products, etc., the change of advertisement content according to the time, the change of displayed advertisement content based on the information stored in the weather data management portion 8508 such as regional/local weather, temperature, etc., and the change of displayed advertisement content based on the information stored in the store information management portion 8506 such as regional/local events, etc. The schedule management portion 8511 further manages whether the display data, such as advertisements, being displayed is a moving image or still image, and in the case of moving image data, the data is transferred to and stored in the HD 63 of a digital multifunction peripheral A1 of each store, and is retrieved from the HD 63 of the digital multifunction peripheral A1 of each store and displayed at a timing according to the display schedule of the schedule management portion 8511. With this configuration, a smooth image display without the influence of data transfer from the server apparatus 85 becomes possible. In the case of still image data, on the other hand, the data is directly transferred to the display apparatus of each store from the content management portion 8509 of the server apparatus 85 and displayed.

The communications portion 8512 performs bidirectional commutations with the external network 72, and distributes the information stored in the content management portion 8509 to the large-format display 21 of each store based on the information stored in the schedule management portion 8511. Alternatively, information sent to the server apparatus 85 is temporarily stored in the RAM of the device control portion 8501, and is transferred to the location according to the content of the information sent from the device control portion 8501.

That is, the present embodiment is configured such that information such as advertisements is displayed on the large-format display 21 under the management of the server apparatus 85.

FIGS. 18A and 18B show an example of the procedure of a process for setting data to be displayed on the large-format display 21 from the digital multifunction peripheral A1. The procedure of the setting process will be described below.

When "Special Function" displayed on the display panel 101 (touch panel 104) of the operation portion 58 shown in FIG. 17 is selected, the display is changed to the screen shown in FIG. 18A(a).

The special function screen shown in FIG. 18A(a) is a screen in which the operation settings of the digital multifunction peripheral A1 are set, and when "display settings" is selected in this screen, the screen is changed to the screen shown in FIG. 18A(b).

The display settings screen shown in FIG. 18A(b) is a screen in which display data to be displayed on the large-format display 21 is selected, and includes "Capture Original", "Web Access" and "Document Filing".

"Capture Original" is selected when capturing display data to be displayed on the large-format display 21 using the scanner portion 54. "Web Access" is used when displaying a specified webpage on the large-format display 21. "Document Filing" is used when displaying the data (image data) stored in the hard disk 63 on the large-format display 21 based on the management information stored in a memory portion (not shown) of the management portion 62. Hereinafter, the process when each of the items on the selection screen is selected will be described.

<1> When "Capture Original" is Selected

When "Capture Original" is selected in FIG. 18A(b), the display is changed to the screen shown in FIG. 18A(c). The screen shown in FIG. 18A(c) is a screen for selecting whether to display an original captured by the scanner portion 54 via the external server apparatus 85 or to display it under the management of the digital multifunction peripheral A1.

When "Interrupt Display" is selected in FIG. 18A(c), the display is changed to the screen shown in FIG. 18B(d), where the date and time at which interrupt display is to be performed is inputted. When the date and time has been inputted and "OK" has been selected, the display is changed to the screen shown in FIG. 18B(e), where the display format of the interrupt display is selected. The format of displaying an interrupt image can be selected from among a superimposition display in which the captured information is displayed superimposed on the display information managed by the external server apparatus 85, and split-screen displays in which the display screen is split horizontally and vertically to display the information. Also, the display screen can be selected to display the information only on the first display screen 22 disposed on the back face side of the digital multifunction peripheral A1, only on the second display screen 23, or on both the first display screen 22 and the second display screen 23.

Figure 19:
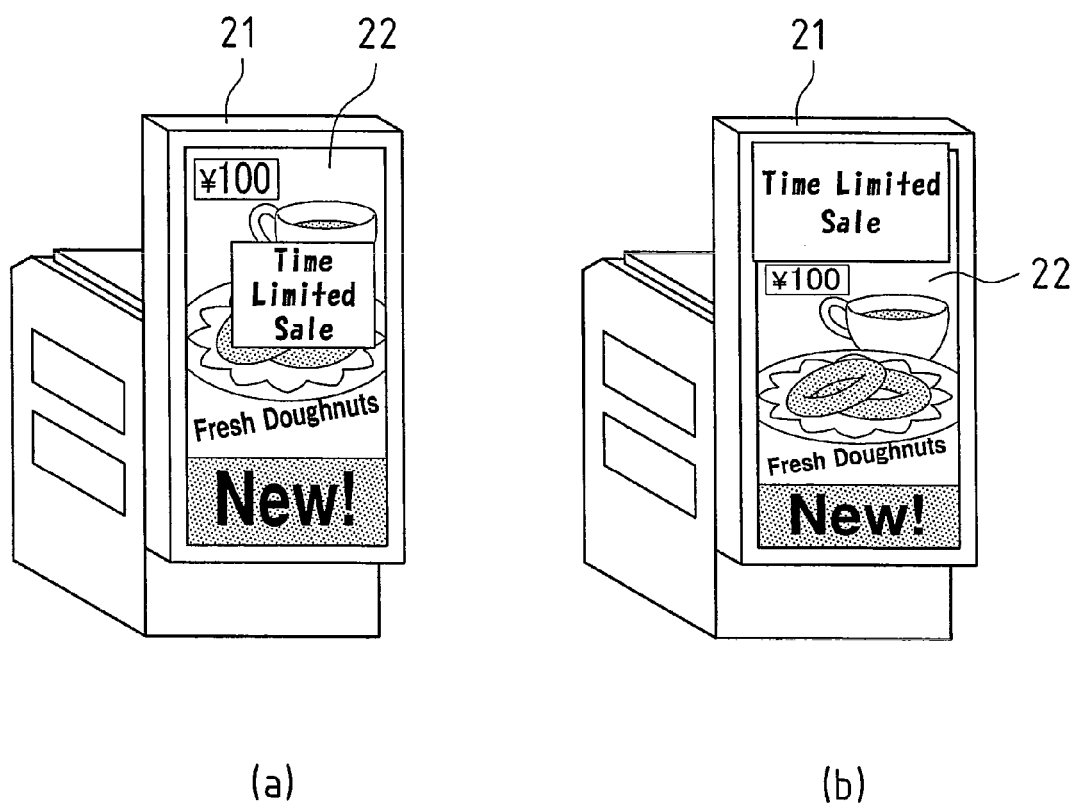
FIGS. 19(a) and 19(b) are explanatory diagrams illustrating examples of displaying advertisement data displayed on a first display screen of a large-format display.

When an appropriate screen display has been selected in the screen shown in FIG. 18B(e) and "OK" has been selected, the display is changed to the screen shown in FIG. 18B(f), where an instruction for scanning an original is displayed. Accordingly, when an original has been placed on the scanner portion 54 while this screen is displayed, and "Start" of the operation portion 58 shown in FIG. 17 has been selected, an interrupt image (a "Time Limited Sale" notice in this example) is displayed on the large-format display 21 as shown in FIG. 19(a) or 19(b). At this time, the original data captured by the scanner portion 54 is stored in the hard disk 63 of the image forming apparatus A1, and the management data such as interrupt display time is managed by the management portion 62. FIG. 19(a) shows an example in which an interrupt image is superimposed on the first display screen 22 displaying an image managed by the server apparatus 85, and FIG. 19(b) shows an example in which an interrupt image is displayed on an upper portion of the first display screen 22 that has been split and an image managed by the server apparatus 85 is displayed on a lower portion of the same. Although not shown, it is also possible to display the interrupt image on the second display screen 23. Furthermore, although not described in the above example, it is also possible to display the interrupt image on the display panel 101 of the operation portion 58 of the digital multifunction peripheral A1.

Figure 20:
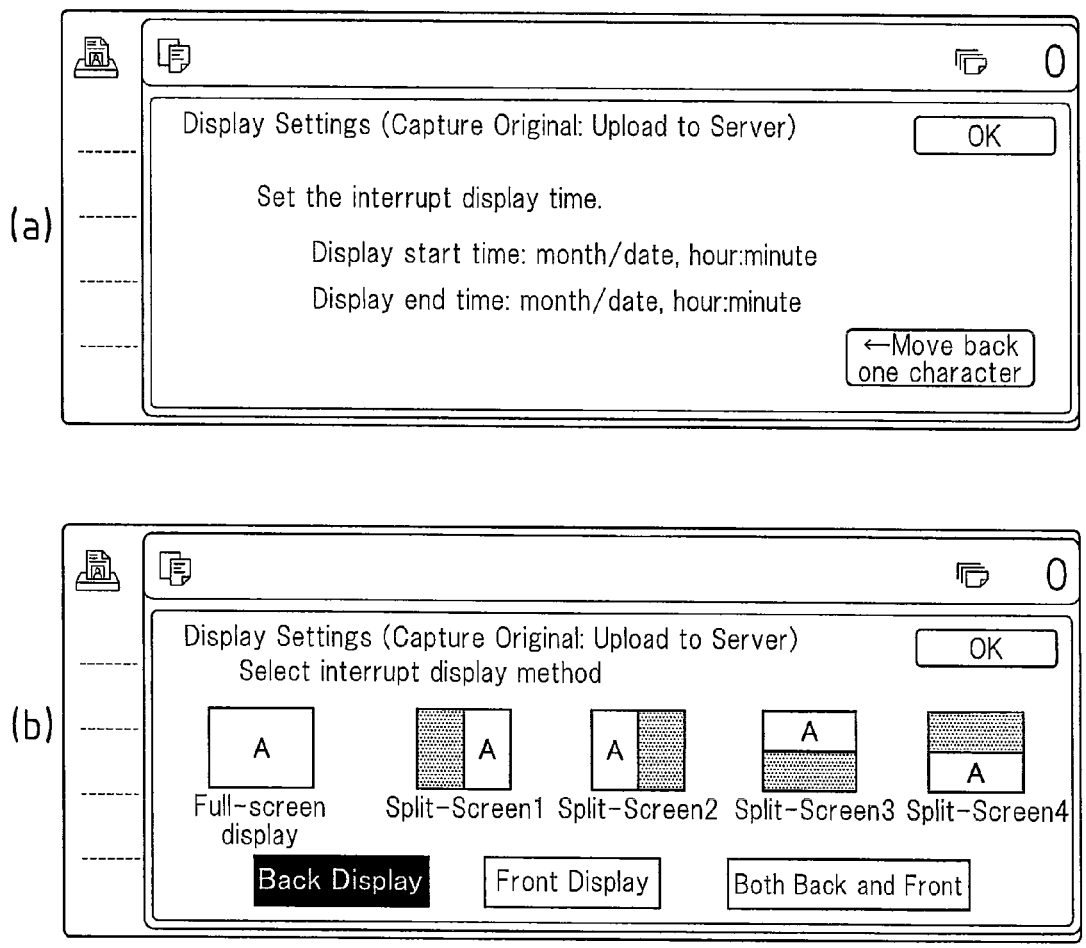
FIGS. 20(a) and 20(b) are explanatory diagrams illustrating the procedure of a process for setting data to be displayed on a large-format display from a display panel.

When, on the other hand, "Upload to Server" is selected in FIG. 18A(c), the display is changed to the screen shown in FIG. 20(a), where the date and time at which interrupt display is to be performed is inputted, as in FIG. 18B(d). When the date and time has been inputted and "OK" has been selected, the display is changed to the screen shown in FIG. 20(b), where the display format of the interrupt display is selected. The format of displaying an interrupt image can be selected from among a full-screen display in which the interrupt image replaces the displayed information managed by the external server apparatus 85, and split-screen displays in which the display screen is split horizontally and vertically. Also, the display screen can be selected to display the information only on the first display screen 22 disposed on the back face side of the digital multifunction peripheral A1, only on the second display screen 23, or on both the first display screen 22 and the second display screen 23.

Figure 21:
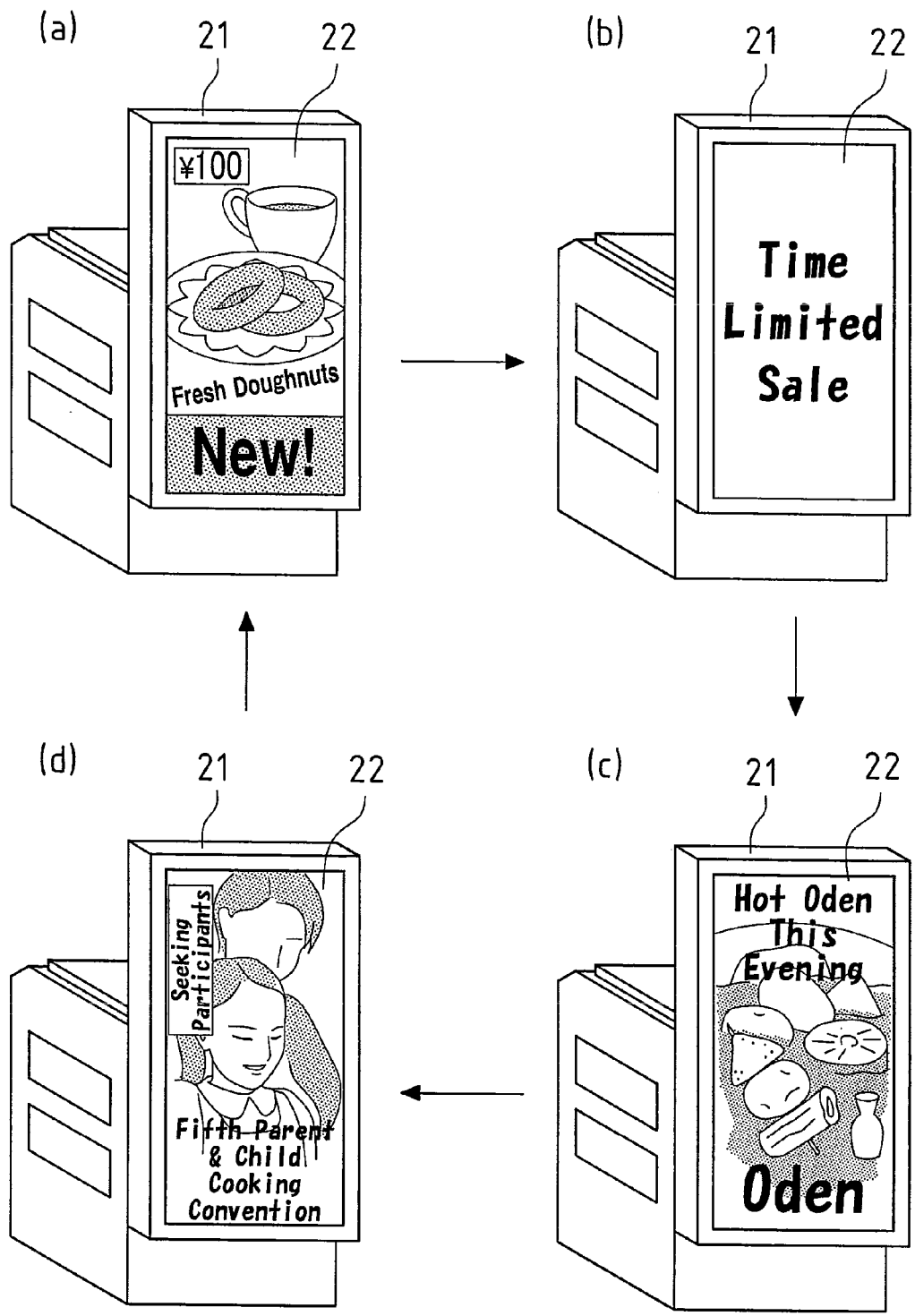
FIGS. 21(a), 21(b), 21(c) and 21(d) are explanatory diagrams illustrating an example of display order when displaying an interrupt image on a large-format display.

When a screen display has been selected in the screen shown in FIG. 20(b) and "OK" has been selected, the display is changed to the screen shown in FIG. 18B(f), where an instruction for scanning an original is displayed. Accordingly, when an original has been placed on the scanner portion 54 while this screen is displayed, and "Start" of the operation portion 58 shown in FIG. 17 has been selected, an interrupt image (a "Time Limited Sale" notice in this example) is displayed on the large-format display 21 as shown in FIG. 21. At this time, the original data captured by the scanner portion 54 is transmitted from the communications portion 61 of the image forming apparatus A1 to the external server apparatus 85 via the LAN 71 and the external network 72, and is stored in the content management portion 8509 via the content receiving portion 8504 of the server apparatus 85. The management data, such as the interrupt display time, is also transmitted from the image forming apparatus A1 to the external server apparatus 85, and is stored in and managed by the schedule management portion 8511 of the server apparatus 85. FIGS. 21(a) to 21(d) show an example in which an interrupt image is displayed on the first display screen 22 displaying images managed by the server apparatus 85, by replacing an image managed by the server apparatus 85. That is, the display changes in the order of FIG. 21(a), FIG. 21(c) and FIG. 21(d) at a predetermined interval of time before interrupt display is performed, but when interrupt display is performed, the display changes in the order of FIG. 21(a), FIG. 21(b), FIG. 21(c) and FIG. 21(d) at a predetermined time interval.

It should be noted that the position at which the interrupt image shown in FIG. 21(b) is inserted can be changed as appropriate according to the set interrupt timing. That is, if FIG. 21(a) is being displayed when interrupt settings are finished, the interrupt image is inserted next to the display image of FIG. 21(a). If FIG. 21(c) is being displayed when interrupt settings are finished, the interrupt image is inserted next to the display image of FIG. 21(c), and if FIG. 21(d) is being displayed when interrupt settings are finished, the interrupt image is inserted next to the display image of FIG. 21(d).

Figure 22:
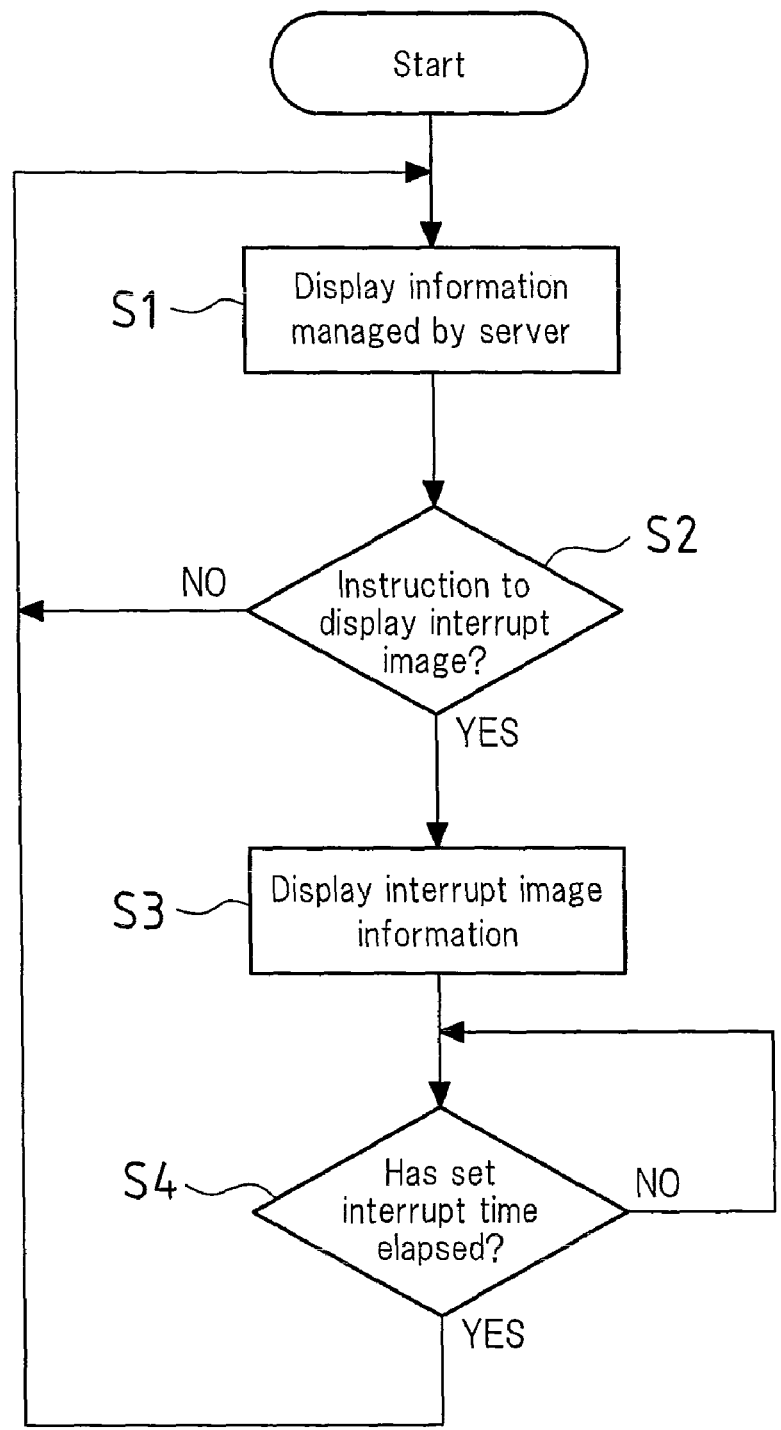
FIG. 22 is a flowchart illustrating the procedure of an interrupt display process.

FIG. 22 is a flowchart of such an interrupt display process. When the images managed by the server apparatus 85 are displayed (step S1), whether or not there is an instruction to display an interrupt image is checked (step S2). If there is no such interrupt instruction, the images managed by the server apparatus 85 are continuously displayed. If, on the other hand, there is an interrupt instruction (if Yes is determined in step S2), an interrupt image is displayed in accordance with the set interrupt instruction (step S3). Then, while the interrupt image is displayed, whether or not the set interrupt time has elapsed is checked (step S4). If the termination time has not been reached, the interrupt display is continued. If, on the other hand, the interrupt time has elapsed (if Yes is determined in step S4), the interrupt display ends, and the procedure returns to step S1, where the display is changed to the display of images managed by the server apparatus 85.

Figure 23:
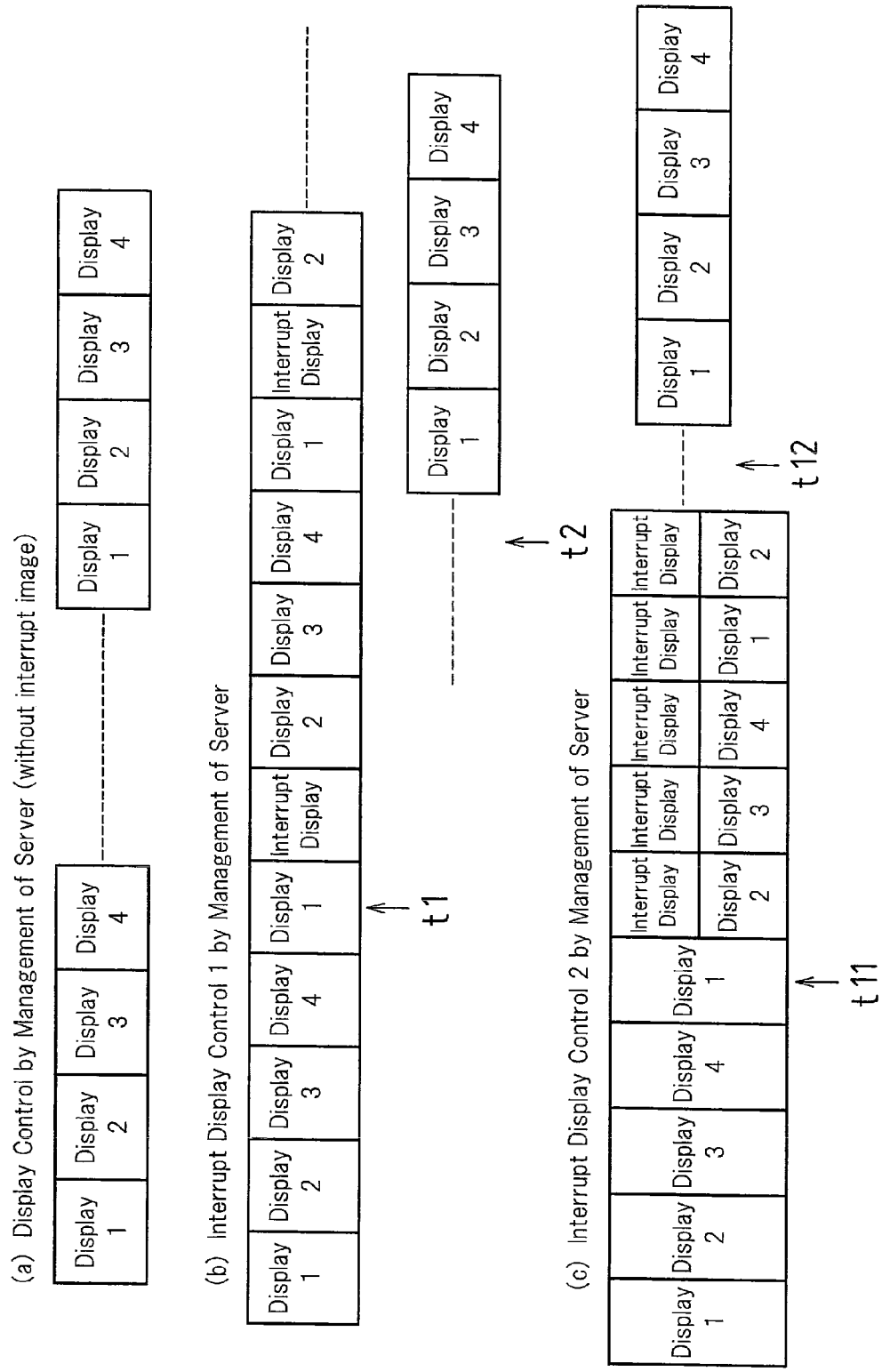
FIGS. 23(a), 23(b) and 23(c) are explanatory diagrams illustrating examples of display control by the management of a server apparatus, showing when there is an interrupt image and when there is no interrupt image.

FIGS. 23(a) to 23(c) are explanatory diagrams illustrating various examples of display transition states when interrupt display is performed.

FIG. 23(a) shows an ordinary display state before interrupt display is performed. Here, the display of advertisements and the like changes in the order of Display 1, Display 2, Display 3 and Display 4 at a predetermined time interval, and this is repeated.

FIG. 23(b) shows a display transition state when settings are made to perform interrupt display with full screen display (that is, settings to perform interrupt display by replacing the screen). During a transition of the display of advertisements and the like in the order of Display 1, Display 2, Display 3 and Display 4, an instruction to perform interrupt display is inputted into the server apparatus 85 while Display 1 is being displayed (t1), and as a result, an interrupt display is inserted when the display transitions from Display 1 to Display 2. Then, after the interrupt display has been displayed for a predetermined length of time, the display is changed to Display 2 and, after that, the display keeps transitioning in the order of Display 1, Interrupt display, Display 2, Display 3 and Display 4 at a predetermined time interval until the set interrupt display termination time. After the interrupt display termination time (t2), the display returns to the ordinary display state where the display transitions in the original order, that is, the order of Display 1, Display 2, Display 3 and Display 4, at a predetermined time interval.

FIG. 23(c) shows an example in which interrupt display is performed by splitting the display screen. The timing (t11) at which an instruction to perform interrupt display is inputted is the same as (t1) of FIG. 23(b), but when interrupt display is performed, the interrupt image is kept displayed on the upper portion (it can be the lower portion, the right portion or the left portion) of the display screen whereas the display of the lower portion of the screen transitions in the order of Display 2, Display 3, Display 4 and Display 1 at a predetermined time interval and, this is repeated. Then, after the interrupt display termination time (t12), the display returns to the ordinary display state where the display transitions in the original order, that is, the order of Display 1, Display 2, Display 3 and Display 4, at a predetermined time interval.

<2> When "Web Access" is Selected

Next, the process performed when "Web Access" is selected while the screen shown in FIG. 18A(b) is displayed on the operation panel 101 will be described.

Figure 24:
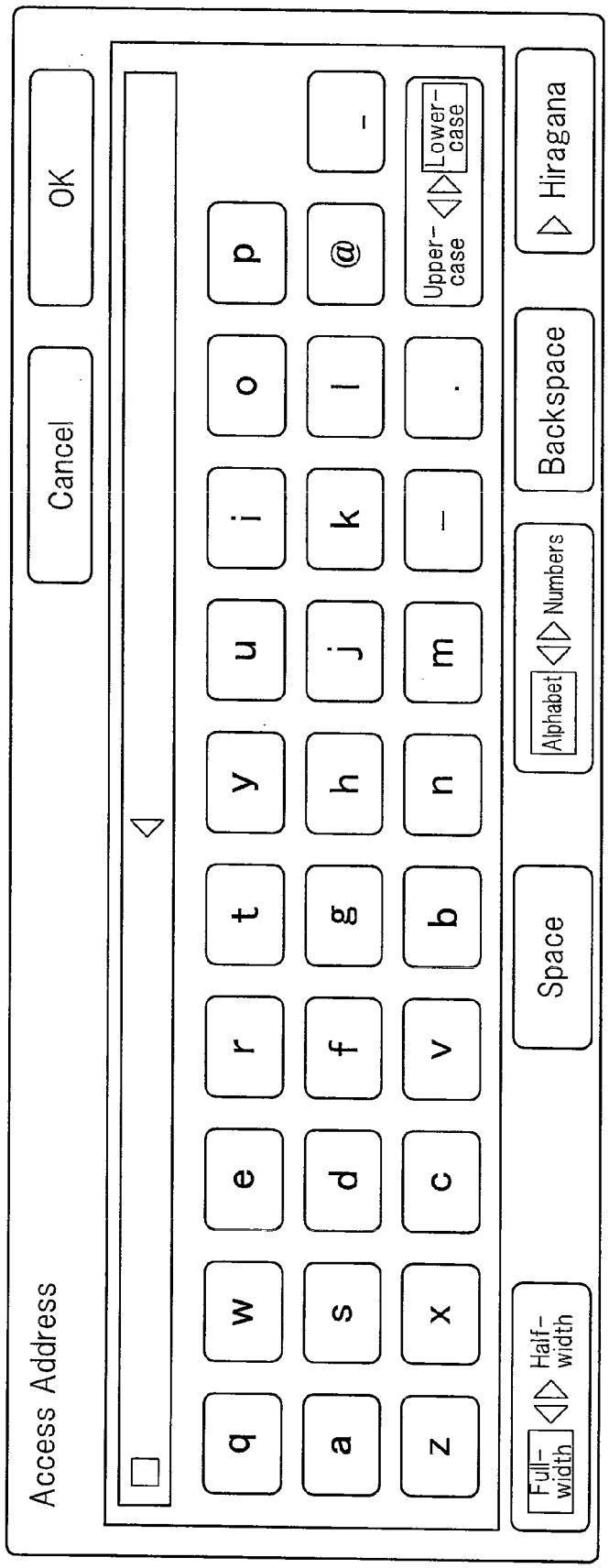
FIG. 24 is an explanatory diagram illustrating an example of character keys displayed on a display panel when "Web Access" has been selected.

"Web Access" is used to display a specified webpage on the large-format display 21. Upon selecting "Web Access", the screen is changed to a screen similar to that shown in FIG. 18A(c) and, then interrupt settings are made with screens similar to those shown in FIGS. 18B(d) and 18B(e) or those shown in FIGS. 20(a) and 20(b). After that, the address of a specified website can be set by using the character keys and the like shown in FIG. 24.

<3> When "Document Filing" is Selected

Next, the process performed when "Document Filing" is selected while the screen shown in FIG. 18A(b) is displayed on the operation panel 101 will be described.

"Document Filing" is used to display data (image data) stored in the hard disk 63 on the large-format display 21 based on the management information stored in the memory portion (not shown) of the management portion 62. Upon selecting "Document Filing", the screen is changed to a screen similar to that shown in FIG. 18A(c) and then interrupt settings are set with screens similar to those shown in FIGS. 18B(d) and 18B(e) or those shown in FIGS. 20(a) and 20(b). After that, the screen is changed to a Document Filing screen shown in FIG. 25(a).

Figure 25:
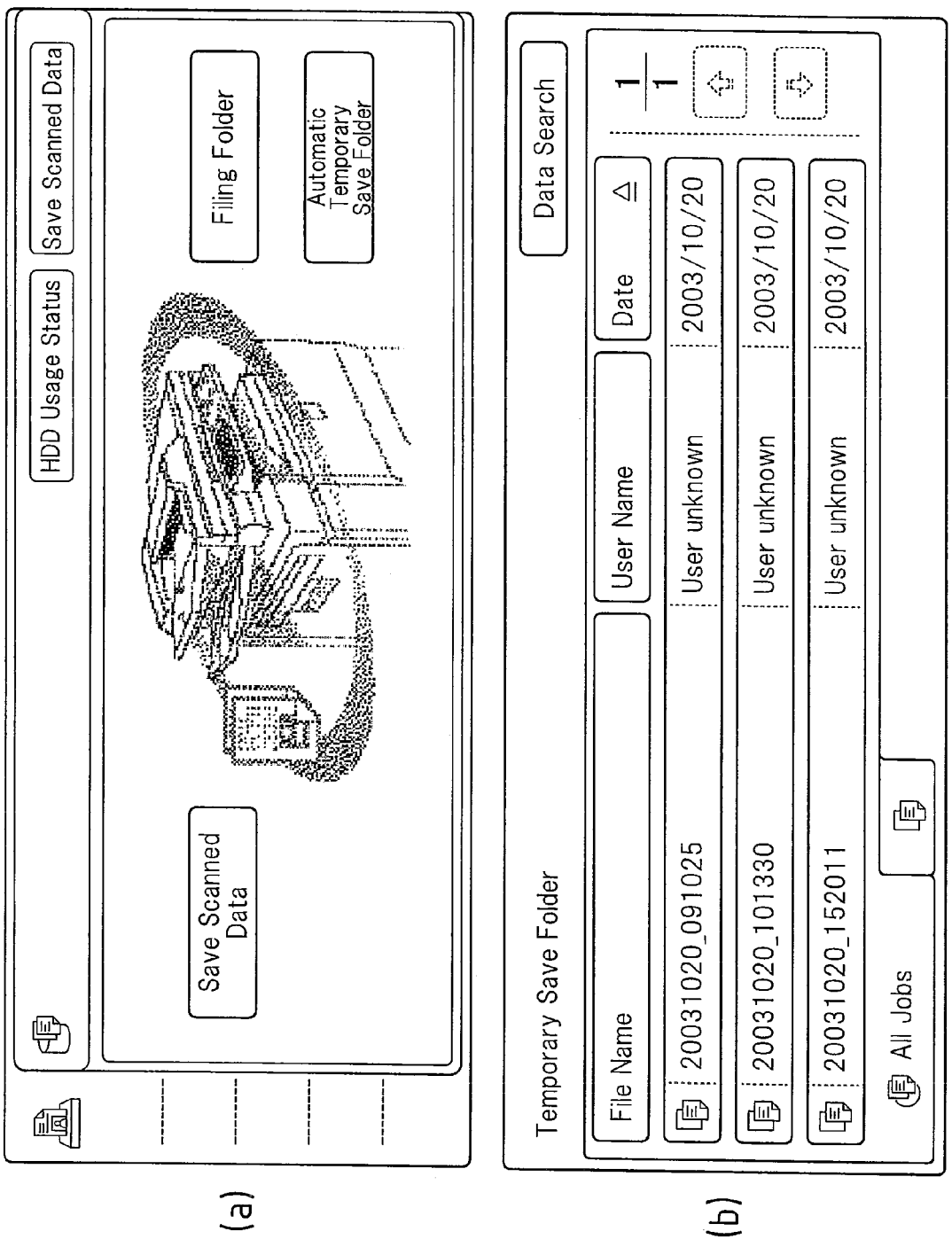
FIGS. 25(a) and 25(b) are explanatory diagrams illustrating an example of character keys displayed on a display panel when "Document Filing" has been selected.

The Document Filing screen shown in FIG. 25(a) includes "Save Scanned Data", "Filing Folder" and "Automatic Temporary Save Folder". FIG. 25(b) is an example of a display screen displayed when "Automatic Temporary Save Folder" is selected in the Document Filing screen, and data to be displayed on the large-format display 21 can be selected by selecting a desired file from the displayed file list. In this case, a plurality of files can be selected, and when a plurality of files are selected, the display data of the selected files will be displayed by, for example, being sequentially changed at a predetermined time interval (or a time interval set by a user).

"Set Details" shown in FIG. 18A(b) is used to display a plurality of screens on the large-format display 21, or to set display time and the like. With this "Set Details", a setting is possible in which, for example, Data A is displayed on the first display screen 22 and Data B is displayed on the second display screen 23.

The data obtained through the operation of each of "Capture Original", "Web Access" and "Document Filing" on the selection screen of FIG. 18A(b) is stored (saved) in the hard disk 63 or saved in the content management portion 8509 through the content receiving portion 8504 of the server apparatus 85. When "Interrupt Display" is selected in FIG. 18A(c), the display management information, such as display time, stored (saved) in the hard disk 63 is stored in the memory portion (not shown) of the management portion 62. When "Upload to Server" is selected in FIG. 18A(c), the display management information, such as display time, saved in the content management portion 8509 of the server apparatus 85 is stored in the schedule management portion 8511. Then, each display screen is displayed on the large-format display 21 based on the display management information stored in the digital multifunction peripheral A1 or the external server apparatus 85.

The above embodiment has been described in the context of performing interrupt display on the first display screen 22, but it may be performed on the second display screen 23. With this configuration, it is possible to notify pedestrians outside of the store of a sudden time-limited sale or the like with a publicity advertisement displayed on the large first display screen 22, and also notify customers inside the store of the time-limited sale of the like with the publicity advertisement displayed on the second display screen 23. In order to prevent content inappropriate for and offensive to the public from being displayed, it is desirable to perform user authentication before interrupt display settings are made.

<When Printing/Outputting Various Data Displayed on Large-Format Display>

Next, an example will be described in which a customer who has viewed various data displayed on the large-format display 21 of the display-integrated image forming apparatus with the above configuration prints/outputs desired data from the digital multifunction peripheral A1.

Figure 26:
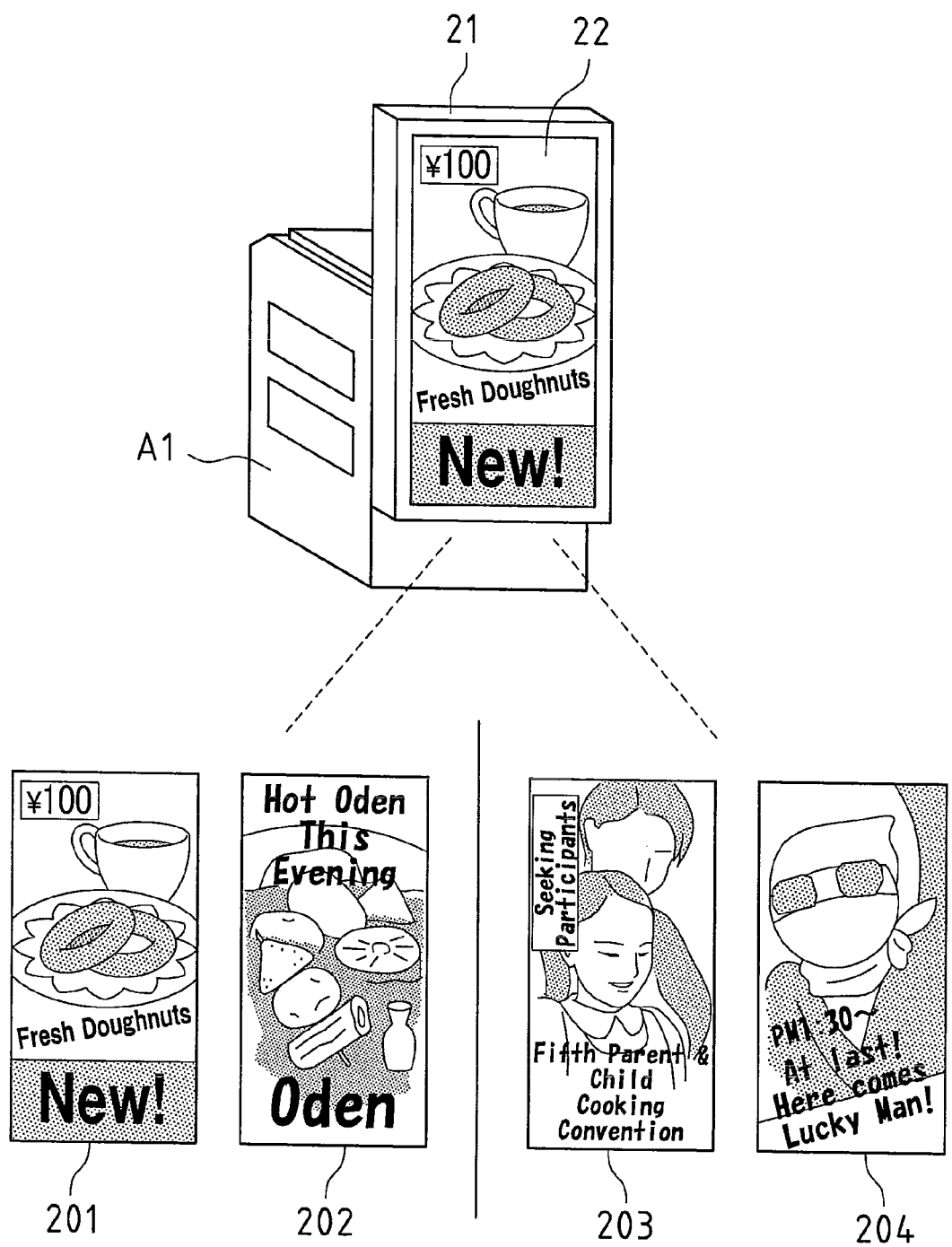
FIG. 26 is an explanatory diagram illustrating a display example of advertisement data for a convenience store, supermarket or the like displayed on a first display screen of a large-format display.

FIG. 26 shows a display example of advertisement data for a convenience store, supermarket or the like displayed on the first display screen 22 of the large-format display 21. In this display example, reference numerals 201 and 202 indicate product introduction advertising data focusing on, for example, food, a menu, a new product, or the like, and reference numerals 203 and 204 indicate event introduction advertising data that introduces, for example, a function, an event, or the like. By displaying such advertisements on the large-format display 21 disposed near the walkway-side glass window, it is possible to publicise an advertisement with impact to pedestrians.

It is assumed here that the advertisement data indicated by reference numerals 201, 202, 203 and 204 of FIG. 26 are displayed sequentially on the first display screen 22 of the large-format display 21 at a predetermined time interval.

Figure 27:
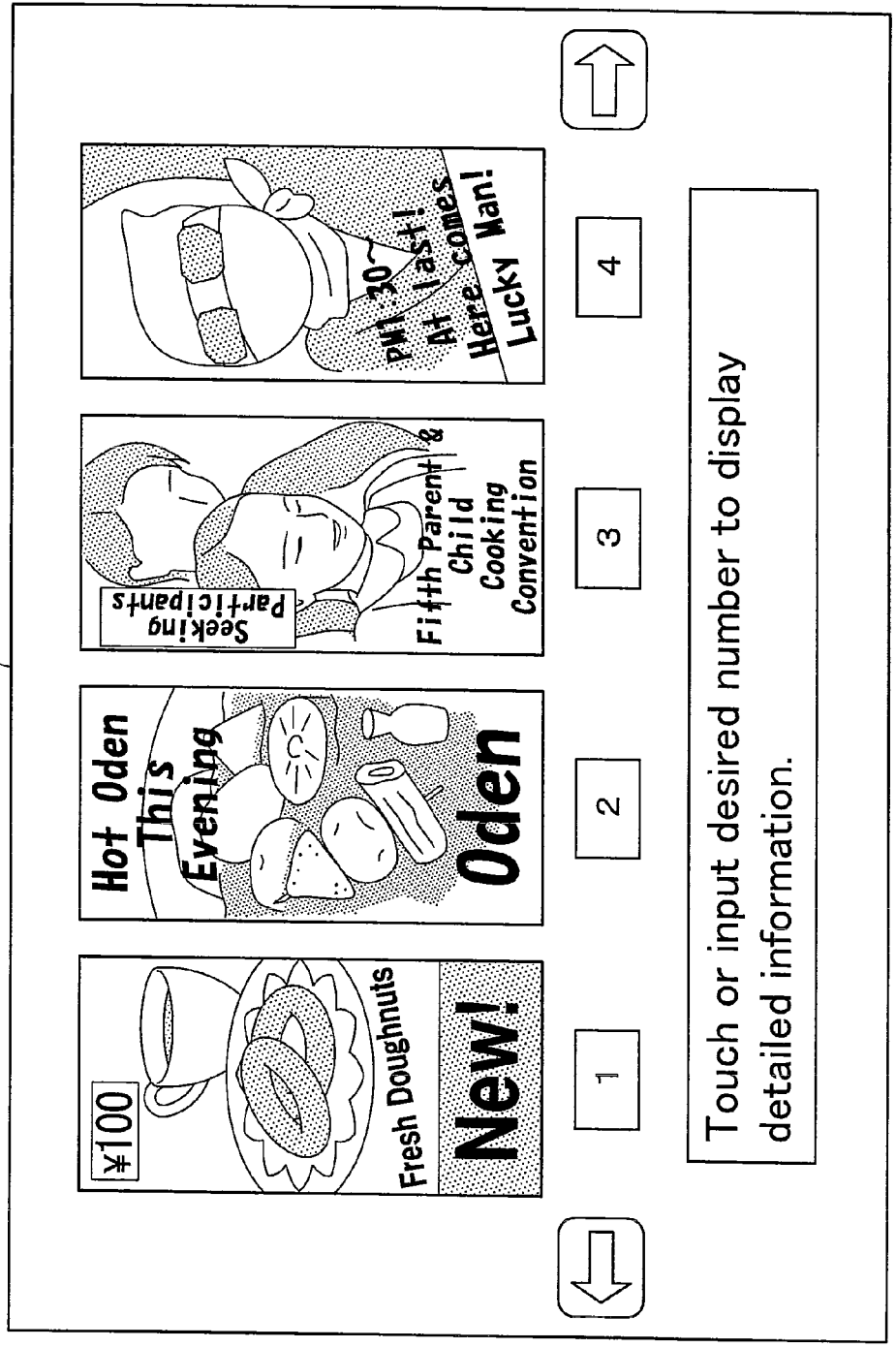
FIG. 27 is an explanatory diagram illustrating a display example of thumbnail images displayed on a second display screen of a large-format display.
Figure 28:
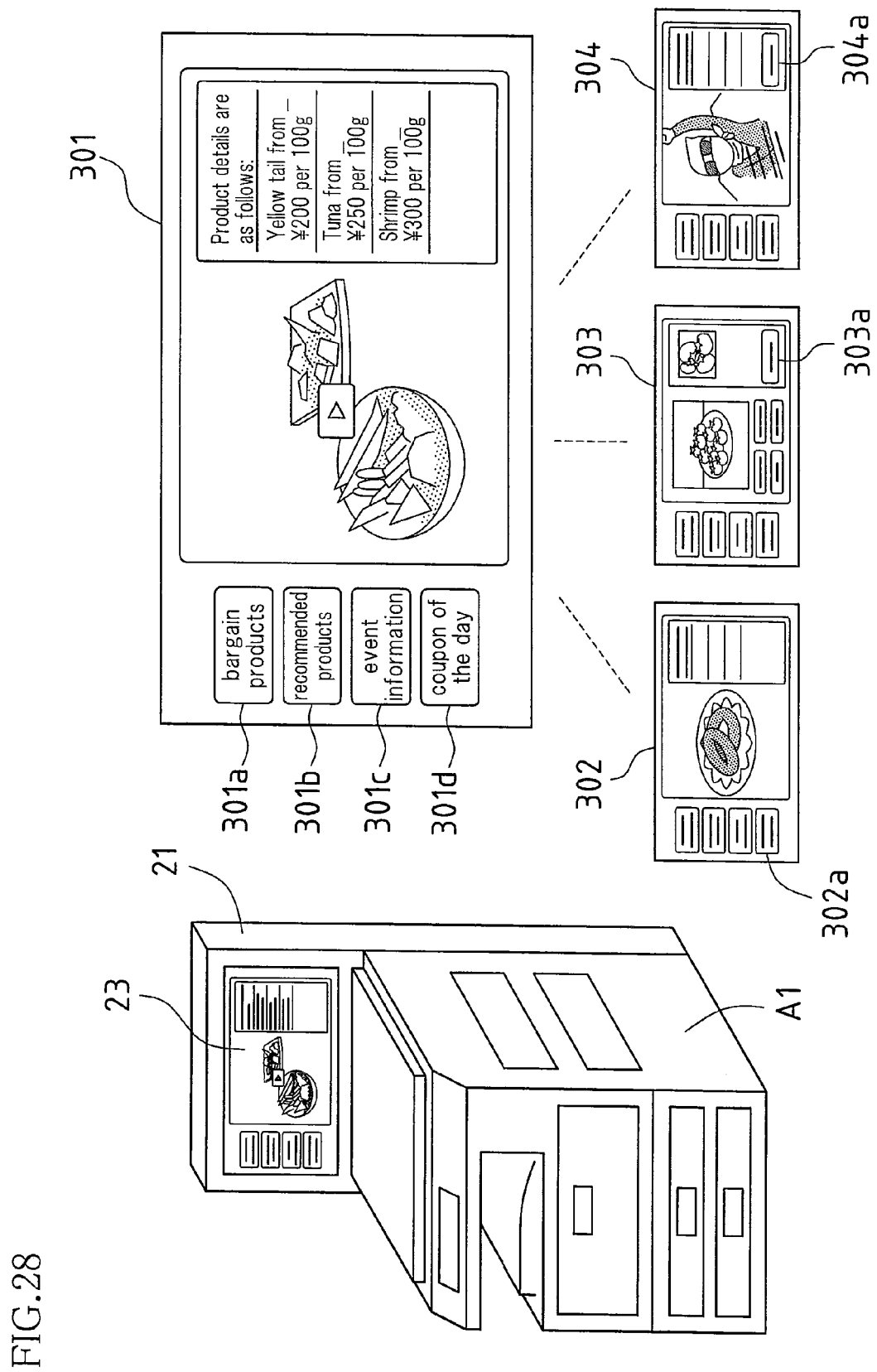
FIG. 28 is an explanatory diagram illustrating exemplary operation performed from a food top page displayed on a second display screen of a large-format display.

When a pedestrian who has viewed the advertisement data enters the store to obtain data related to the advertisement and arrives in front of the digital multifunction peripheral A1, thumbnail images representing the images sequentially displayed on the first display screen 22 are displayed on the second display screen 23 of the large-format display 21 as shown in FIG. 27. The customer touches the second display screen 23 or inputs a desired number using the operation panel (it is assumed here that "2" has been selected) and, thereby, a food information top page indicated by reference numeral 301 of FIG. 28 is displayed as related information of the selected information. As already described above, this display screen is provided with a touch panel for inputting operations, so if the customer (operator) who viewed this screen touches, for example, "Bargain Products" 301a, bargain information indicated by reference numeral 302 is displayed on the second display screen 23. Then, if the operator touches, for example, "Coupon of The Day" 302a of the bargain information screen, although not shown, a screen for confirming whether or not to print a coupon is displayed, and when the operator then touches "Print" in that screen, the device control portion 59 receives this instruction, reads the data for the bargain product of the day and coupon data that are saved in the hard disk 63 or the content management portion 8509 of the external server apparatus 85, and prints/outputs those pieces of data via the image processing portion 55a and the print portion 55d. That is, a coupon is issued. In order to prevent the issuance of an excessive amount of coupons unnecessarily, a method can be adopted in which the data is transmitted to a portable terminal 84 such as a cell phone.

If the operator who viewed the food information top page screen 301 shown in FIG. 28 touches, for example, "Recommended Products" 301b, recommended product information indicated by reference numeral 303 is displayed on the second display screen 23. Then, if the operator touches, for example, "Print" 303a of the recommended product information screen 303, the device control portion 59 receives this instruction, reads the description data of a recommended product and recipe data that uses the recommended product that are saved in the hard disk 63 or the content management portion 8509 of the external server apparatus 85, and prints/outputs those pieces of data via the image processing portion 55a and the print portion 55d.

If the operator who viewed the food information top page screen 301 shown in FIG. 28 touches, for example, "Event Information" 301c, event information indicated by reference numeral 304 is displayed on the second display screen 23. Then, if the operator touches "Print" 304a of the event information screen 304, the device control portion 59 receives this instruction, reads the description data for a time-limited sale or the present month's event information and ticket data for participating in those events that are saved in the hard disk 63 or the content management portion 8509 of the external server apparatus 85, and prints/outputs those pieces of data via the image processing portion 55a and the print portion 55d. That is, a ticket is issued.

If the operator who viewed the food information top page screen 301 shown in FIG. 28 touches, for example, "Coupon of The Day" 301d, although not shown, a list of issuable coupons is displayed, and when the operator touches a desired coupon from that list and then touches "Print" (not shown), the device control portion 59 receives this instruction, reads the data for that coupon saved in the hard disk 63 or the content management portion 8509 of the external server apparatus 85, and prints/outputs that data via the image processing portion 55a and the print portion 55d. That is, a coupon is issued. Although not described in the above example, it is also possible to display thumbnail images as shown in FIG. 27 on the display panel 101 of the operation portion 58 of the digital multifunction peripheral A1.

As the recording paper used when various data displayed on the large-format display 21 is printed/outputted with the digital multifunction peripheral A1, recording paper different from that used when providing a copy service for a fee can be used. That is, the print/output of data displayed on the large-format display 21 is provided as a service for the purpose of securing store customers, so it is necessary to allow consumers to use this service as a free service without concern. In other words, it is assumed that this service is provided free of charge. Accordingly, when printing/outputting data displayed on the large-format display 21, by using recording paper with advertising printed on the back, it is possible to have the advertiser bear the burden of the cost of printing, and thus allow consumers to print data as a free service without concern.

Figure 29:
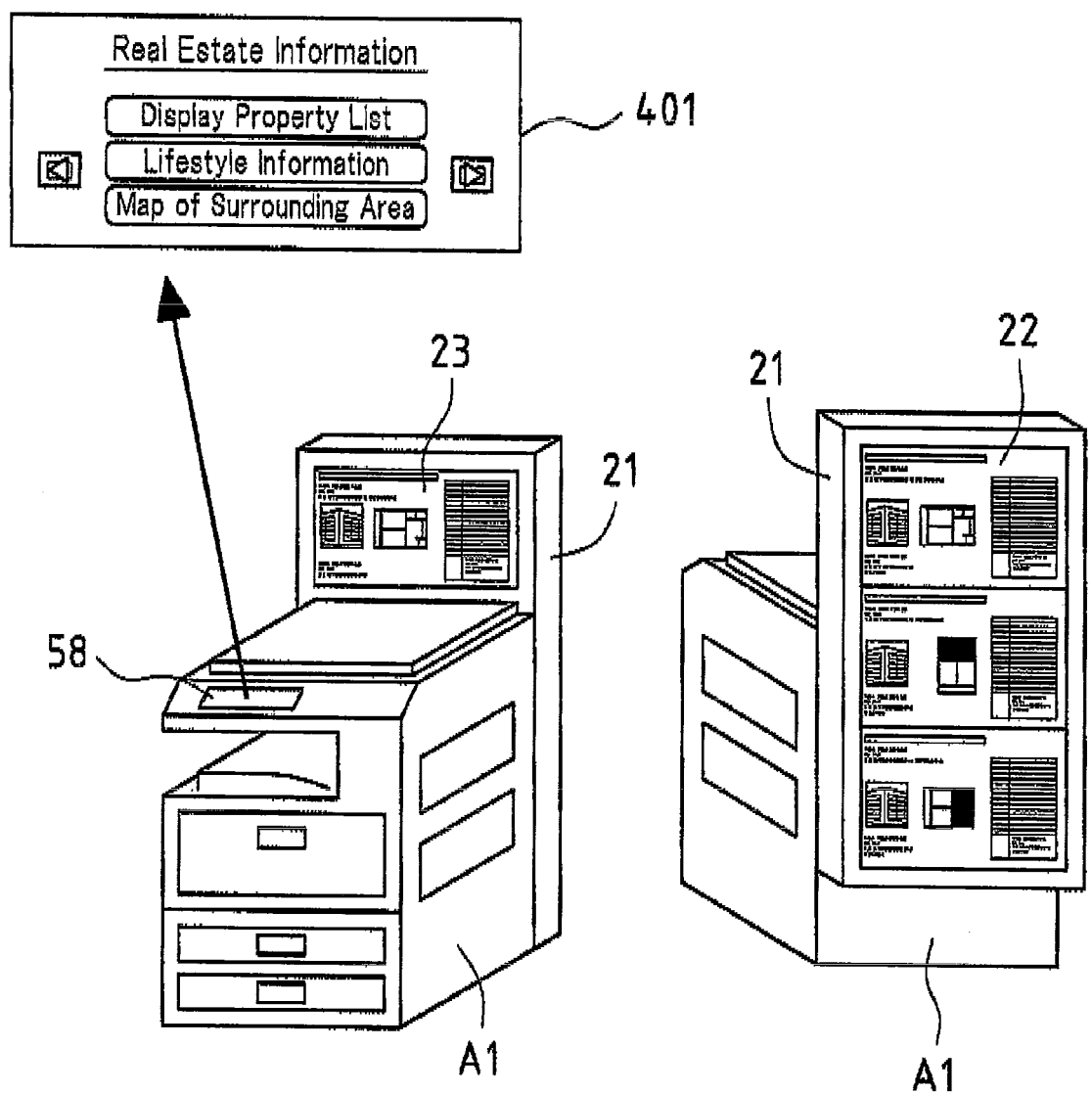
FIG. 29 is an explanatory diagram illustrating a display example of a display screen when a display-integrated image forming apparatus of the present invention is used in a real estate company.
Figure 30:
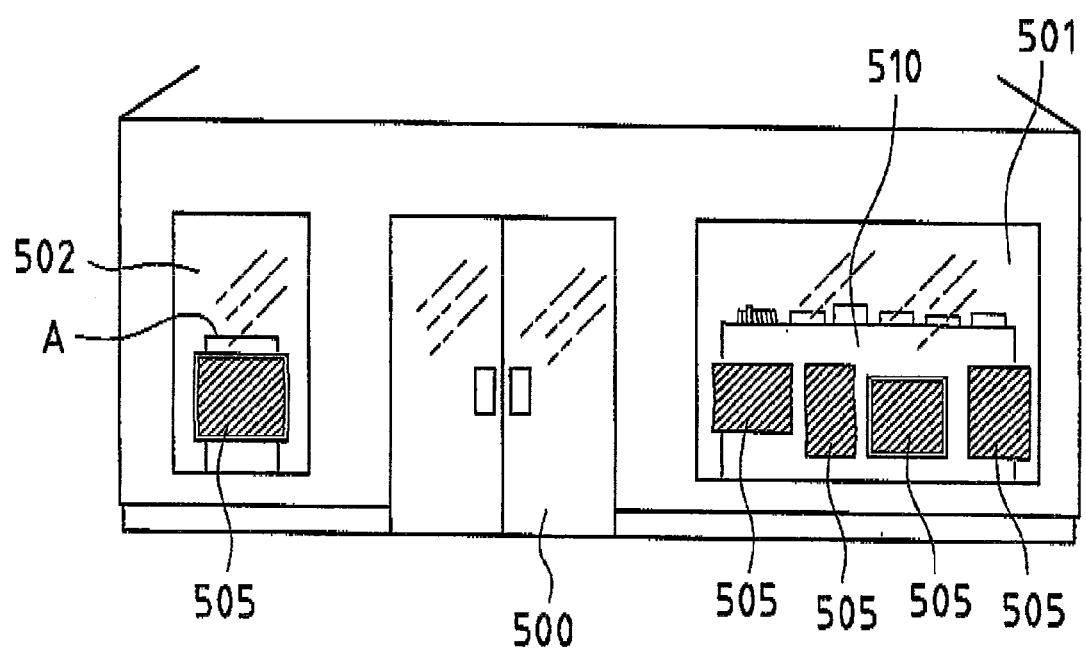
FIG. 30 illustrates an ordinary arranged configuration of a convenience store.

The above embodiment is concerned with a convenience store, a supermarket, or the like, but FIG. 29 shows an embodiment using the display-integrated image forming apparatus of the present invention in a real estate company.

Recently, in real estate companies as well, a technique has been adopted in which a side of the store facing a walkway is entirely encased in glass, and advertisements are posted on this glass face. Accordingly, by disposing the first display screen 22 of the large-format display 21 of the display-integrated image forming apparatus of the present invention near the glass face, as is the case with the above convenience store or the like, it is possible to publicise an advertisement of real estate information.

That is, as shown in FIG. 29, information regarding a plurality of properties is displayed. When a pedestrian who has viewed this property information enters the office in order to obtain data related to that property, and arrives in front of the digital multifunction peripheral A1, a property information top page indicated by reference numeral 401 in FIG. 29 is displayed on the display panel 101 (touch panel 104) of the operation portion 58, and the customer (operator) who viewed this screen selects "Display Property List", and then selects the desired property information. Here, a configuration may be adopted in which, for example, simple consecutive numbers or the like are assigned to the property information displayed on the first display screen 22, so that when a selection is made from the property list, it is possible to select the property using its assigned number. With this configuration, the selected property information is displayed on the second display screen 23, so when the operator who has confirmed the content presses the start button of the operation portion 58, the device control portion 59 reads the data of the selected property information saved in the hard disk 63, and prints/outputs the property information data via the image processing portion 55a and the print portion 55d.

Note that in the display-integrated image forming apparatus of the above embodiment, the large-format display 21 is provided so as to be rotatable along the apparatus case 11 of the digital multifunction peripheral A1. Accordingly, it is necessary that the device control portion 59 switches the display direction of the first and second display screens 22 and 23 according to the rotation angle of the large-format display 21. Therefore, in the present embodiment, a rotation angle detection portions 64 is disposed in the rotating disk 43 of the display rotation mechanism portion 40. As for the portion of detecting the rotation direction and rotation angle of the rotating disk 43, conventionally, various proposals have been made and, the widely known techniques can be used in the present embodiment. However, as the simplest configuration, a configuration may be adopted in which limit switches 64a, 64b, and 64c (see FIGS. 6 and 7) are disposed at the bottom of the pin grooves 43a, 43b, and 43c, respectively and, when the tip of the rotation fixing pin 46 has engaged with any of the pin grooves, the corresponding limit switch is switched on. By inputting the on/off signals of these limit switches 64a, 64b, and 64c into the device control portion 59, the device control portion 59 knows the rotation direction and rotation angle position of the large-format display 21, so based on these signals, it is possible for the device control portion 59 to switch the display direction of the first and second display screens 22 and 23 of the large-format display 21. With this configuration, it is possible to adopt various installation modes according to store circumstances.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A display-integrated image forming apparatus comprising:
an original capturing portion, an operation portion, a print portion which performs print operation in response to an operation of the operation portion, and a control portion which controls these portions,
wherein a display apparatus that has a display screen visible from a back face or a side face of the image forming apparatus is disposed on at least the back face or one side face of a case of the image forming apparatus, and
wherein the control portion is connected to a server apparatus via a network, and
displays various pieces of provided information managed by the server apparatus on the display screen, and
displays image information set by an administrator of the image forming apparatus by interrupting the display of the various pieces of provided information obtained from the server apparatus being displayed,
wherein a second display apparatus having a second display screen visible to an operator of the image forming apparatus is disposed such that it protrudes above the case of the image forming apparatus, and the control portion displays various pieces of provided information managed by the server apparatus on both the display screen and the second display screen.

2. The display-integrated image forming apparatus according to claim 1,
wherein when desired information is selected from information being displayed on the display apparatus via the operation portion, the control portion prints/outputs the selected information by the print portion.

3. The display-integrated image forming apparatus according to claim 1, further comprising a communications portion,
wherein when desired information is selected via the operation portion, the control portion transmits the selected information to a portable terminal by the communications portion.

4. The display-integrated image forming apparatus according to claim 1,
wherein the operation portion has a display portion, and
the control portion displays various pieces of provided information managed by the server apparatus on both the display screen and the display portion.

5. The display-integrated image forming apparatus according to claim 4,
wherein the control portion displays related information that is related to the provided information displayed on the display screen on the display portion.

6. The display-integrated image forming apparatus according to claim 5,
wherein the control portion displays selection information for selecting a piece of related information from the provided information displayed on the display screen, on the second display screen or the display portion.

7. The display-integrated image forming apparatus according to claim 4,
wherein when desired information is selected via the operation portion, the control portion prints/outputs the selected information by the print portion.

8. The display-integrated image forming apparatus according to claim 4, further comprising a communications portion,
wherein when desired information is selected via the operation portion, the control portion transmits the selected information to a portable terminal by the communications portion.

9. The display-integrated image forming apparatus according to claim 1, wherein the control portion displays related information that is related to the provided information displayed on the display screen on the second display screen.

10. The display-integrated image forming apparatus according to claim 1,
wherein the operation portion has a display portion, and
a second display apparatus having a second display screen visible to an operator of the image forming apparatus is disposed such that it protrudes above the case of the image forming apparatus, and
the control portion displays various pieces of provided information managed by the server apparatus on each of the display screen, the second display screen and the display portion.

11. The display-integrated image forming apparatus according to claim 10,
wherein the control portion displays related information that is related to the provided information displayed on the display screen on both the second display screen and the display portion.

12. The display-integrated image forming apparatus according to claim 1, wherein, aside from the operation portion, the second display screen serves as a second operation portion, and operation is possible from either or both of the operation portion and the second operation portion.

13. The display-integrated image forming apparatus according to claim 12, wherein a time period during which interrupt display is performed can be set from the operation portion or the second operation portion.

14. The display-integrated image forming apparatus according to claim 1, wherein when desired information is selected from the information being displayed on the display apparatus via the operation portion or the second operation portion, the control portion prints/outputs the selected information by the print portion.

15. The display-integrated image forming apparatus according to claim 1, further comprising a communications portion, wherein when desired information is selected from the information being displayed on the display apparatus via the operation portion or the second operation portion, the control portion transmits the selected information to a portable terminal by the communications portion.

16. The display-integrated image forming apparatus according to claim 1, wherein the control portion displays the provided information being displayed on the display screen on the second display screen or the display portion in the form of thumbnail images.

17. The display-integrated image forming apparatus according to claim 1,
wherein the control portion displays the image information superimposed on the provided information.

18. The display-integrated image forming apparatus according to claim 1,
wherein the control portion displays the image information and the provided information side by side.

19. The display-integrated image forming apparatus according to claim 1,
wherein the image information is image information of an original that has been captured by the original capturing portion.

20. The display-integrated image forming apparatus according to claim 1, wherein the image information is image data that has been inputted into the apparatus by the administrator.

21. The display-integrated image forming apparatus according to claim 1, wherein the image information is image data of a webpage that has been obtained via the network.

22. The display-integrated image forming apparatus according to claim 1, wherein the provided information is moving image data or still image data.

23. The display-integrated image forming apparatus according to claim 22,
wherein in the case where provided information transmitted from the server apparatus when displaying the provided information is moving image data, the control portion of the image forming apparatus temporarily stores the moving image data in a storage portion and displays the moving image data on the display screen by reading the moving image data from the storage portion.

24. The display-integrated image forming apparatus according to claim 22,
wherein in the case where provided information transmitted from the server apparatus when displaying the provided information is still image data, the control portion of the image forming apparatus displays the still image data on the display screen without temporarily storing the still image data in the storage portion.

25. The display-integrated image forming apparatus according to claim 1, wherein the provided information is managed based on POS data.

26. The display-integrated image forming apparatus according to claim 1, wherein the provided information is managed based on climate data.

27. The display-integrated image forming apparatus according to claim 1, wherein the provided information is managed based on regional/local data.

28. An image display system in which the display-integrated image forming apparatus according to claim 1 and a server apparatus are connected via a network,
wherein the control portion transmits image information set by an administrator of the image forming apparatus to the server apparatus, and the server apparatus transmits the image information to the image forming apparatus such that the transmitted image information interrupts various pieces of provided information managed by the server apparatus.

29. The image display system according to claim 28,
wherein the server apparatus transmits the image information to the image forming apparatus so as to interrupt a display of the various pieces of provided information such that a display of the image information is displayed superimposed on the display of the various pieces of provided information.

30. The image display system according to claim 28,
wherein the server apparatus transmits the image information to the image forming apparatus to interrupt a display of the various pieces of provided information such that a display of various pieces of provided information and the display of the image information are displayed side by side.

31. The image display system according to claim 28,
wherein the server apparatus transmits the image information to the image forming apparatus so as to interrupt the various pieces of provided information such that the various pieces of provided information managed by the server apparatus and the image information are sequentially changed and displayed on the display screen.

32. The display-integrated image forming apparatus according to claim 1,
wherein when the control portion receives, via the operation portion, an instruction of an interrupt display by replacing a screen, the control portion sequentially changes and displays on the display screen the image information set by the administrator of the image forming apparatus and the various pieces of provided information obtained from the server apparatus being displayed.

33. An image display method in an image display system in which an image forming apparatus, in which a display apparatus that has a display screen visible from a back face or a side face of the image forming apparatus is disposed on at least the back face or one side face of a case of the image forming apparatus, and a server apparatus that manages various pieces of provided information displayed on the display screen are connected via a network, the method comprising the steps of:
by the image forming apparatus, obtaining various pieces of provided information managed by the server apparatus;
displaying the obtained various pieces of provided information on the display screen of the display apparatus;
when desired information is selected from the information being displayed on the display screen via an operation portion of the image forming apparatus, outputting the selected information;
transmitting image information set by an administrator to the server apparatus by the image forming apparatus;
transmitting, by the server apparatus, the image information to the image forming apparatus such that the transmitted image information interrupts the various pieces of provided information managed by the server apparatus; and
wherein in the image forming apparatus, a second display apparatus having a second display screen that is visible to an operator of the image forming apparatus and serves as a second operation portion is disposed such that it protrudes above the case of the image forming apparatus,
the server apparatus manages various pieces of provided information displayed on the display screen and the second display screen
in the step of displaying various pieces of provided information, the obtained various pieces of provided information is further displayed on the second display screen of the second display apparatus, and
in the step of outputting selected information, when desired information is selected from the information being displayed on the display screen via the operation portion and the second display screen of the image forming apparatus, the selected information is outputted.

34. The image display method according to claim 33, further comprising a step of, by the server apparatus, transmitting the image information to the image forming apparatus so as to interrupt a display of provided information managed by the server apparatus such that a display of the image information is displayed superimposed on the display of provided information.

35. The image display method according to claim 33, further comprising a step of, by the server apparatus, transmitting the image information to the image forming apparatus to interrupt a display of provided information managed by the server apparatus such that the display of provided information and a display of the image information are displayed side by side.

36. The image display method according to claim 33, further comprising the step of transmitting, by the server apparatus, the image information to the image forming apparatus so as to interrupt the various pieces of provided information such that the various pieces of provided information managed by the server apparatus and the image information are sequentially changed and displayed on the display screen.

* * * * *